(12) United States Patent
Kimchi et al.

(10) Patent No.: US 11,649,053 B2
(45) Date of Patent: May 16, 2023

(54) HEXAGONAL RING WING AERIAL VEHICLE

(71) Applicant: Amazon Technologies, Inc., Seattle, WA (US)

(72) Inventors: Gur Kimchi, Seattle, WA (US); Louis Leroi LeGrand, III, Seattle, WA (US); Dominic Timothy Shiosaki, Seattle, WA (US); Ricky Dean Welsh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/384,979

(22) Filed: Jul. 26, 2021

(65) Prior Publication Data

US 2022/0097844 A1    Mar. 31, 2022

Related U.S. Application Data

(60) Continuation of application No. 16/682,638, filed on Nov. 13, 2019, now Pat. No. 11,091,263, which is a
(Continued)

(51) Int. Cl.
*B64C 39/02* (2023.01)
*B64C 29/02* (2006.01)
(Continued)

(52) U.S. Cl.
CPC ............ *B64C 39/024* (2013.01); *B64C 11/46* (2013.01); *B64C 27/20* (2013.01); *B64C 27/26* (2013.01);
(Continued)

(58) Field of Classification Search
CPC ......... B64C 39/06; B64C 27/20; B64C 27/26; B64C 29/0016; B64C 29/0033;
(Continued)

(56) References Cited

U.S. PATENT DOCUMENTS 2,952,422 A * 9/1960 Fletcher .................. B64C 29/02
D12/325
3,350,035 A * 10/1967 Schlieben ............... B64C 29/02
244/7 R
(Continued)

FOREIGN PATENT DOCUMENTS

CN    101765540 A    6/2010
CN    102785775 A    11/2012
(Continued)

OTHER PUBLICATIONS

International Search Report and Written Opinion for PCT/US2018/018253, dated Apr. 13, 2018, 9 pages.
(Continued)

*Primary Examiner* — Richard G Davis
(74) *Attorney, Agent, or Firm* — Athorus, PLLC

(57) ABSTRACT

Described is an apparatus and method of an aerial vehicle, such as an unmanned aerial vehicle ("UAV") that can operate in either a vertical takeoff and landing (VTOL) orientation or a horizontal flight orientation. The aerial vehicle includes a plurality of propulsion mechanisms that enable the aerial vehicle to move in any of the six degrees of freedom (surge, sway, heave, pitch, yaw, and roll) when in the VTOL orientation. The aerial vehicle also includes a ring wing that surrounds the propulsion mechanisms and provides lift to the aerial vehicle when the aerial vehicle is operating in the horizontal flight orientation.

20 Claims, 20 Drawing Sheets

Related U.S. Application Data division of application No. 15/435,121, filed on Feb. 16, 2017, now Pat. No. 10,518,880.

(51) Int. Cl.
| | | |
|---|---|---|
| *B64C 27/20* | (2023.01) | |
| *B64C 11/46* | (2006.01) | |
| *B64C 27/26* | (2006.01) | |
| *B64C 39/06* | (2006.01) | |

(52) U.S. Cl.
CPC ............ *B64C 29/02* (2013.01); *B64C 39/062* (2013.01); *B64C 2201/027* (2013.01); *B64C 2201/028* (2013.01); *B64C 2201/042* (2013.01); *B64C 2201/104* (2013.01); *B64C 2201/128* (2013.01); *B64C 2201/165* (2013.01)

(58) Field of Classification Search
CPC ............ B64C 29/062; B64C 2201/027; B64C 2201/028; B64C 2201/042; B64C 2201/104; B64C 2201/165
See application file for complete search history.

(56) References Cited

U.S. PATENT DOCUMENTS

| | | | | |
|---|---|---|---|---|
| 9,499,266 | B1* | 11/2016 | Garreau | ............... B64C 9/00 |
| 2005/0178879 | A1* | 8/2005 | Mao | ............ B64C 29/02 |
| | | | | 244/7 B |
| 2007/0023581 | A1 | 2/2007 | La | |
| 2007/0215746 | A1* | 9/2007 | Rieken | ............ B64C 39/06 |
| | | | | 244/45 R |
| 2007/0221779 | A1 | 9/2007 | Ikeda | |
| 2011/0042509 | A1* | 2/2011 | Bevirt | ............ B64C 29/0033 |
| | | | | 244/12.4 |
| 2011/0226892 | A1 | 9/2011 | Crowther et al. | |
| 2015/0108282 | A1 | 4/2015 | Kanaoka | |
| 2017/0217585 | A1* | 8/2017 | Hulsman | ............ B64C 29/02 |
| 2018/0002011 | A1* | 1/2018 | McCullough | ............ B64C 27/26 |
| 2019/0248480 | A1* | 8/2019 | Whitten, Jr. | ............ B64C 39/024 |

FOREIGN PATENT DOCUMENTS

| | | |
|---|---|---|
| CN | 103625640 A | 3/2014 |
| DE | 102009033821 A1 | 1/2011 |
| EP | 1775214 A1 | 4/2007 |
| GB | 2462452 B | 2/2011 |
| JP | 2002347698 A | 12/2002 |
| JP | 2003512253 A | 4/2003 |
| JP | 2005263112 A | 9/2005 |
| JP | 2007137074 A | 6/2007 |
| JP | 2013193510 A | 9/2013 |
| WO | 0130652 A1 | 5/2001 |
| WO | 2001030652 A1 | 5/2001 |
| WO | 2008129244 A3 | 12/2008 |
| WO | 2010015866 A2 | 2/2010 |
| WO | 2015150529 A1 | 10/2015 |
| WO | 2015187836 A1 | 12/2015 |

OTHER PUBLICATIONS

Andrew Rosenblum et al, "The Jets of the Future," May 1, 2012, Retrieved from the Internet on Mar. 27, 2018: URL: https://www.popsci.com/technology/article/2012-04/jets-future, pp. 1-9.
Dirtflare, "Ring Wing VTOL!!!," Specifications Ring Wing VTOL!!!, Aug. 1, 2016, Retrieved from the Internet on Mar. 22, 2018: URL: https://www.simpleplanes.com/a/Mo2vSy/Ring-Wing-VTOL, pp. 1-2.
Search report dated Sep. 16, 2020, for 1st office action in corresponding Chinese Application No. 201880025071.3.

* cited by examiner

HEXAGONAL RING WING AERIAL VEHICLE

PRIORITY CLAIM

This application is a continuation of and claims priority to U.S. patent application Ser. No. 16/682,638, filed Nov. 13, 2019, which is a divisional of and claims priority to U.S. patent application Ser. No. 15/435,121, now U.S. Pat. No. 10,518,880, filed Feb. 16, 2017, the contents of each of which are herein incorporated by reference in their entirety.

BACKGROUND

Unmanned vehicles, such as unmanned aerial vehicles ("UAV"), ground and water based automated vehicles, are continuing to increase in use. For example, UAVs are often used by hobbyists to obtain aerial images of buildings, landscapes, etc. Likewise, unmanned ground based units are often used in materials handling facilities to autonomously transport inventory within the facility. While there are many beneficial uses of these vehicles, they also have many drawbacks. For example, due to current design limitations, unmanned aerial vehicles are typically designed for either agility or efficiency, but not both. Likewise, aerial vehicles are designed to only operate with four degrees of freedom—pitch, yaw, roll, and heave.

DETAILED DESCRIPTION

This disclosure describes aerial vehicles, such as UAVs (e.g., quad-copters, hex-copters, hepta-copters, octa-copters) that can operate in a vertical takeoff and landing (VTOL) orientation or in a horizontal flight orientation. Likewise, when the aerial vehicle is in a VTOL orientation it can transition independently in any of the six degrees of freedom. Specifically, as described herein, the aerial vehicles may efficiently rotate in any of the three degrees of freedom rotation (pitch, yaw, and roll) and/or any of the three degrees of freedom translation (surge, heave, and sway). For example, the aerial vehicle may include six propulsion mechanisms that are oriented at different angles and therefore, together, can provide thrust in the vertical direction and/or the horizontal direction when the aerial vehicle is in a VTOL orientation.

As discussed further below, a ring wing is included on the aerial vehicle that surrounds the propulsion mechanisms of the aerial vehicle and provides both protection around the propulsion mechanisms and lift when the aerial vehicle is in the horizontal flight orientation and navigating in a substantially horizontal direction.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items (also referred to herein as a payload) may be delivered. For example, the delivery location may be a person's residence, a place of business, a location within a materials handling facility (e.g., packing station, inventory storage), or any location where a user or inventory is located, etc. Inventory or items may be any physical goods that can be transported using an aerial vehicle. For example, an item carried by a payload of an aerial vehicle discussed herein may be ordered by a customer of an electronic commerce website and aerially delivered by the aerial vehicle to a delivery location.

Figure 1:
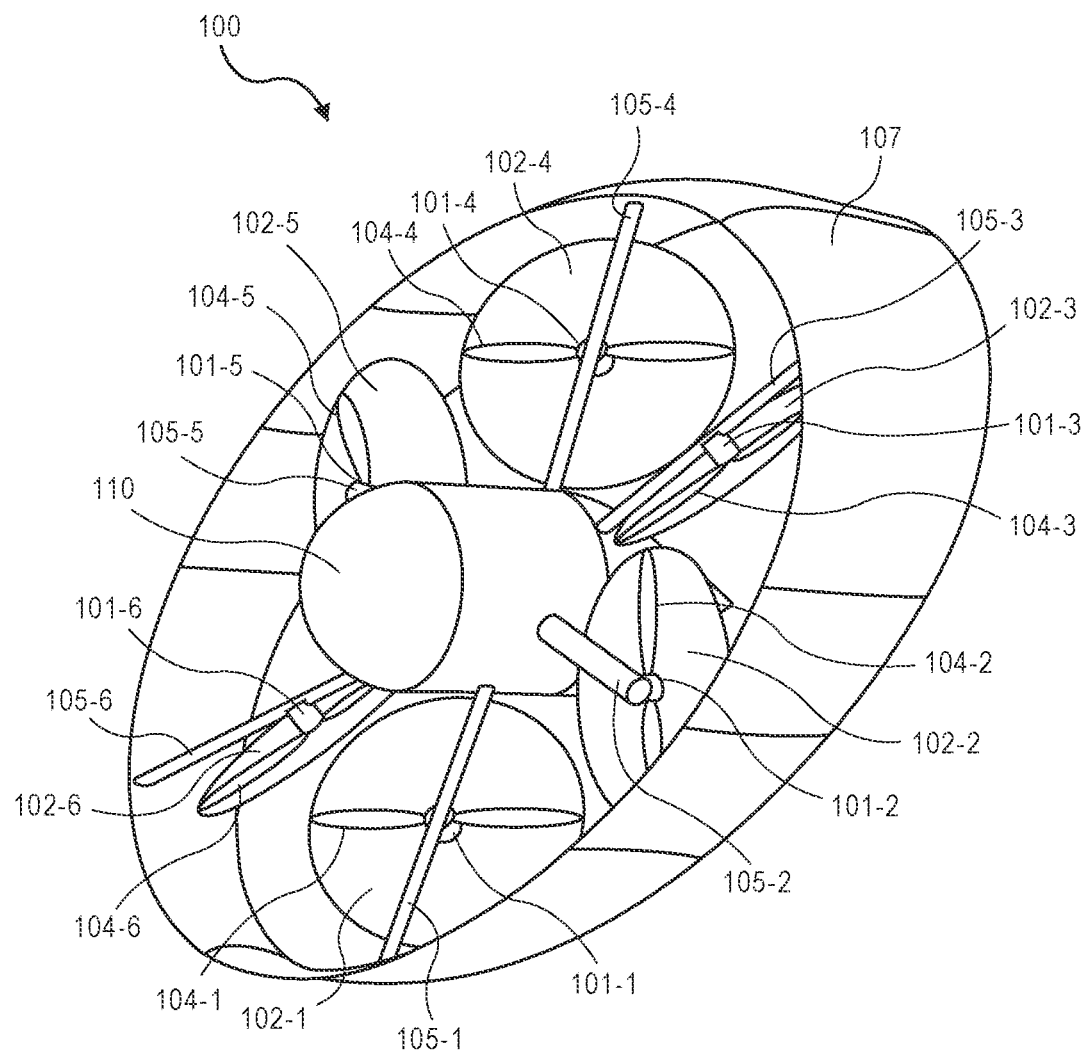
FIGS. 1-4 illustrate various views of an aerial vehicle with a substantially circular shaped ring wing, in accordance with disclosed implementations.

FIG. 1 illustrates a view of an aerial vehicle 100 with a ring wing that is substantially cylindrical in shape and that surrounds a plurality of propulsion mechanisms, in accordance with disclosed implementations. The aerial vehicle 100 includes six motors 101-1, 101-2, 101-3, 101-4, 101-5, and 101-6 and corresponding propellers 104-1, 104-2, 104-

3, 104-4, 104-5, and 104-6 spaced about the fuselage 110 of the aerial vehicle 100. The propellers 104 may be any form of propeller (e.g., graphite, carbon fiber) and of any size. For example, the propellers may be 10 inch-12-inch diameter carbon fiber propellers.

The form and/or size of some of the propellers may be different than other propellers. Likewise, the motors 101 may be any form of motor, such as a DC brushless motor, and may be of a size sufficient to rotate the corresponding propeller. Likewise, in some implementations, the size and/or type of some of the motors 101 may be different than other motors 101. In some implementations, the motors may be rotated in either direction such that the force generated by the propellers may be either a positive force, when rotating in a first direction, or a negative force, when rotating in the second direction. Alternatively, or in addition thereto, the pitch of the blades of a propeller may be variable. By varying the pitch of the blades, the force generated by the propeller may be altered to either be in a positive direction or a negative direction. Still further, in some implementations, the pitch of the blades may be adjusted such that they are aligned with the direction of travel and thus provide no drag if they are not rotating.

Each pair of motors 101 and corresponding propellers 104 will be referred to herein collectively as a propulsion mechanism 102, such as propulsion mechanisms 102-1, 102-2, 102-3, 102-4, 102-5, and 102-6. Likewise, while the example illustrated in FIG. 1 describes the propulsion mechanisms 102 as including motors 101 and propellers 104, in other implementations, other forms of propulsion may be utilized as the propulsion mechanisms 102. For example, one or more of the propulsion mechanisms 102 of the aerial vehicle 100 may utilize fans, jets, turbojets, turbo fans, jet engines, and/or the like to maneuver the aerial vehicle. Generally described, a propulsion mechanism 102, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 102-1, 102-2, 102-3, 102-4, 102-5, and 102-6) may be configured such that their individual orientations may be dynamically modified (e.g., change from vertical to horizontal flight orientation) or any position therebetween.

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

The aerial vehicle 100 also includes a ring wing 107 having a substantially cylindrical shape that extends around and forms the perimeter of the aerial vehicle 100. In the illustrated example, the ring wing is substantially circular in shape and tapers toward the bottom of the aerial vehicle. The ring wing 107 has an airfoil shape to produce lift when the aerial vehicle is oriented as illustrated in FIG. 1 and moving in a direction that is substantially horizontal. As illustrated, and discussed further below, the ring wing is positioned at an angle with respect to the fuselage 110 such that the lower part of the ring wing acts as a front wing as it is toward the front of the aerial vehicle when oriented as shown and moving in a horizontal direction. The top of the ring wing, which has a longer chord length than the bottom portion of the ring wing 107, is farther back and thus acts as a rear wing.

The ring wing is secured to the fuselage 110 by motor arms 105. In the illustrated example, each of motors arms 105-1, 105-2, 105-3, 105-4, 105-5, and 105-6 are coupled to the fuselage 110 at one end, extend from the fuselage 110 and couple to the ring wing 107 at a second end, thereby securing the ring wing 107 to the fuselage 110.

The fuselage 110, motor arms 105, and ring wing 107 of the aerial vehicle 100 may be formed of any one or more suitable materials, such as graphite, carbon fiber, and/or aluminum.

Each of the propulsion mechanisms 102 are coupled to a respective motor arm 105 such that the propulsion mechanism 102 is substantially contained within the perimeter ring wing 107. For example, propulsion mechanism 102-1 is coupled to motor arm 105-1, propulsion mechanism 102-2 is coupled to motor arm 105-2, propulsion mechanism 102-3 is coupled to motor arm 105-3, propulsion mechanism 102-4 is coupled to motor arm 105-4, propulsion mechanism 102-5 is coupled to motor arm 105-5, and propulsion mechanism 102-6 is coupled to motor arm 105-6. In the illustrated example, each propulsion mechanism 102 is coupled at an approximate mid-point of the respective motor arm 105 between the fuselage 110 and the ring wing 107. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 110 or closer toward the ring wing 107).

As illustrated, the propulsion mechanisms 102 may be oriented at different angles with respect to each other. For example, propulsion mechanisms 102-2 and 102-5 are aligned with the fuselage 110 such that the force generated by each of propulsion mechanisms 102-2 and 102-5 is in-line or in the same direction or orientation as the fuselage. In the illustrated example, the aerial vehicle 100 is oriented for horizontal flight such that the fuselage is oriented horizontally in the direction of travel. In such an orientation, the propulsion mechanisms 102-2 and 102-5 provide horizontal forces, also referred to herein as thrusting forces, and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of the fuselage 110. When the aerial vehicle 100 is oriented horizontally as shown in FIG. 1 for horizontal flight, the propulsion mechanisms 102-1, 102-3, 102-4, and 102-6 may be used as propulsion mechanisms, providing thrust in a non-horizontal direction to cause the aerial vehicle to pitch, yaw, roll, heave and/or sway. In other implementations, during horizontal flight, the propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by the thrusting propulsion mechanisms 102-2 and 102-5.

The angle of orientation of each of the propulsion mechanisms 102-1, 102-3, 102-4, and 102-6 may vary for different implementations. Likewise, in some implementations, the offset of the propulsion mechanisms 102-1, 102-3, 102-4, and 102-6 may each be the same, with some oriented in one direction and some oriented in another direction, may each be oriented different amounts, and/or in different directions.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of the propulsion mechanisms is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about the third motor arm 105-2 and oriented toward propulsion mechanism 102-3. Finally, propulsion mechanism 102-4 is oriented approximately thirty degrees in the first direction about the fourth motor arm 105-4 and toward propulsion mechanism 102-5. As illustrated, propulsion mechanisms 102-2 and 102-5, which are on opposing sides of the fuselage 110, are aligned and oriented a same first direction (in this example, horizontal). Propulsion mechanisms 102-3 and 102-6, which are on opposing sides of the fuselage 110, are aligned and oriented in a same second direction, which is angled compared to the first direction. Propulsion mechanisms 102-1 and 102-4, which are on opposing sides of the fuselage 110, are aligned and oriented a same third direction, which is angled compared to the first direction and the second direction.

Figure 2:
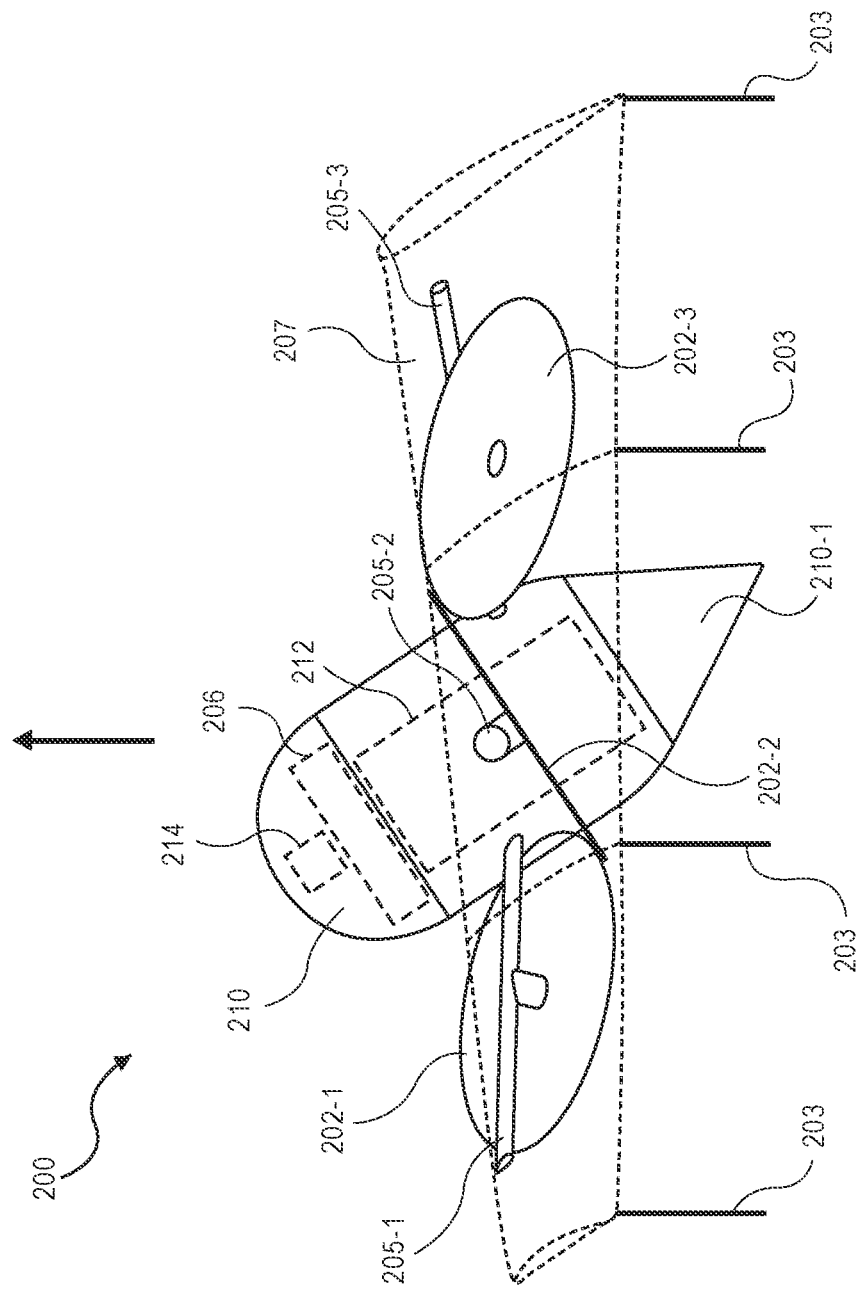

FIG. 2 illustrates a side view of the aerial vehicle 200 oriented for vertical takeoff and landing (VTOL), in accordance with disclosed implementations. The aerial vehicle 200 corresponds to the aerial vehicle 100 discussed above with respect to FIG. 1. When oriented as illustrated in FIG. 2, the aerial vehicle may maneuver in any of the six degrees of freedom (pitch, yaw, roll, heave, surge, and sway), thereby enabling VTOL and high maneuverability.

As illustrated, when the aerial vehicle is oriented for VTOL, the motor arms, such as motor arms 205-1, 205-2, and 205-3, and the ring wing 207 are aligned approximately horizontally and in the same plane. In this orientation, each of the propulsion mechanisms are offset or angled with respect to the horizontal and/or vertical direction. As such, each propulsion mechanism 202, when generating a force, generates a force that includes both a horizontal component and a vertical component. In the illustrated example, each propulsion mechanism is angled approximately thirty degrees with respect to vertical. Likewise, as discussed above, adjacent propulsion mechanisms are angled in opposing directions to form pairs of propulsion mechanisms. For example, propulsion mechanism 202-2 is oriented toward propulsion mechanism 202-3. As discussed further below, angling adjacent propulsion mechanisms toward one another to form pairs of propulsion mechanisms allows horizontal forces from each propulsion mechanism to cancel out such that the pair of propulsion mechanisms can produce a vertical force. Likewise, if one of the propulsion mechanisms of a pair of propulsion mechanisms is producing a larger force than the other propulsion mechanism of the pair, a net horizontal force will result from the pair of propulsion mechanisms. Accordingly, when the aerial vehicle 200 is oriented for VTOL with angled propulsion mechanisms, as illustrated in FIG. 2, the aerial vehicle can move independently in any of the six degrees of freedom. For example, if the aerial vehicle is to surge in the X direction, it can do so by altering the forces produced by the propulsion mechanisms to generate a net horizontal force in the X direction without having to pitch forward to enable a surge in the X direction.

To enable the fuselage to be oriented horizontally with an offset ring wing 207 during horizontal flight, as illustrated in FIG. 1, the fuselage is rotated at an angle when the aerial vehicle 200 is oriented for VTOL, as illustrated in FIG. 2. In this example, the fuselage 210 is angled at approximately thirty degrees from vertical. In other implementations, the amount of rotation from vertical may be greater or less depending on the amount of offset desired for the ring wing 207 when the aerial vehicle 200 is oriented for horizontal flight.

The aerial vehicle may also include one or more landing gears 203 that are extendable to a landing position, as illustrated in FIG. 2. During flight, the landing gear 203 may be retracted into the interior of the ring wing 207 and/or may be rotated up and remain along the trailing edge of the ring wing. In still other examples, the landing gear may be permanently affixed.

The fuselage 210 may be used to store one or more components of the aerial vehicle, such as the aerial vehicle control system 214, power module 206, and/or a payload 212 that is transported by the aerial vehicle. The aerial vehicle control system is discussed further below. The power module(s) 206 may be removably mounted to the aerial vehicle 200. The power module(s) 206 for the aerial vehicle may be, for example, in the form of battery power, solar power, gas power, super capacitor, fuel cell, alternative power generation source, or a combination thereof. The power module(s) 206 are coupled to and provide power for the aerial vehicle control system 214, the propulsion mechanisms 202, and the payload engagement module 210-1.

In some implementations, one or more of the power modules may be configured such that it can be autonomously removed and/or replaced with another power module. For example, when the aerial vehicle lands at a delivery location, relay location and/or materials handling facility, the aerial vehicle may engage with a charging member at the location that will recharge the power module.

The payload 212 may be any payload that is to be transported by the aerial vehicle. In some implementations, the aerial vehicle may be used to aerially deliver items ordered from customers for aerial delivery and the payload may include one or more customer ordered items. For example, a customer may order an item from an electronic commerce website and the item may be delivered to a customer specified delivery location using the aerial vehicle 200.

In some implementations, the fuselage 210 may include a payload engagement module 210-1. For example, the payload engagement module 210-1 may be a hinged portion of the fuselage 210 that can rotate between an open position, in which the interior of the fuselage is accessible so that the payload 212 may be added to or removed from the fuselage, and a closed position, as illustrated in FIG. 2, so that the payload 212 is secured within the interior of the fuselage.

Figure 3:
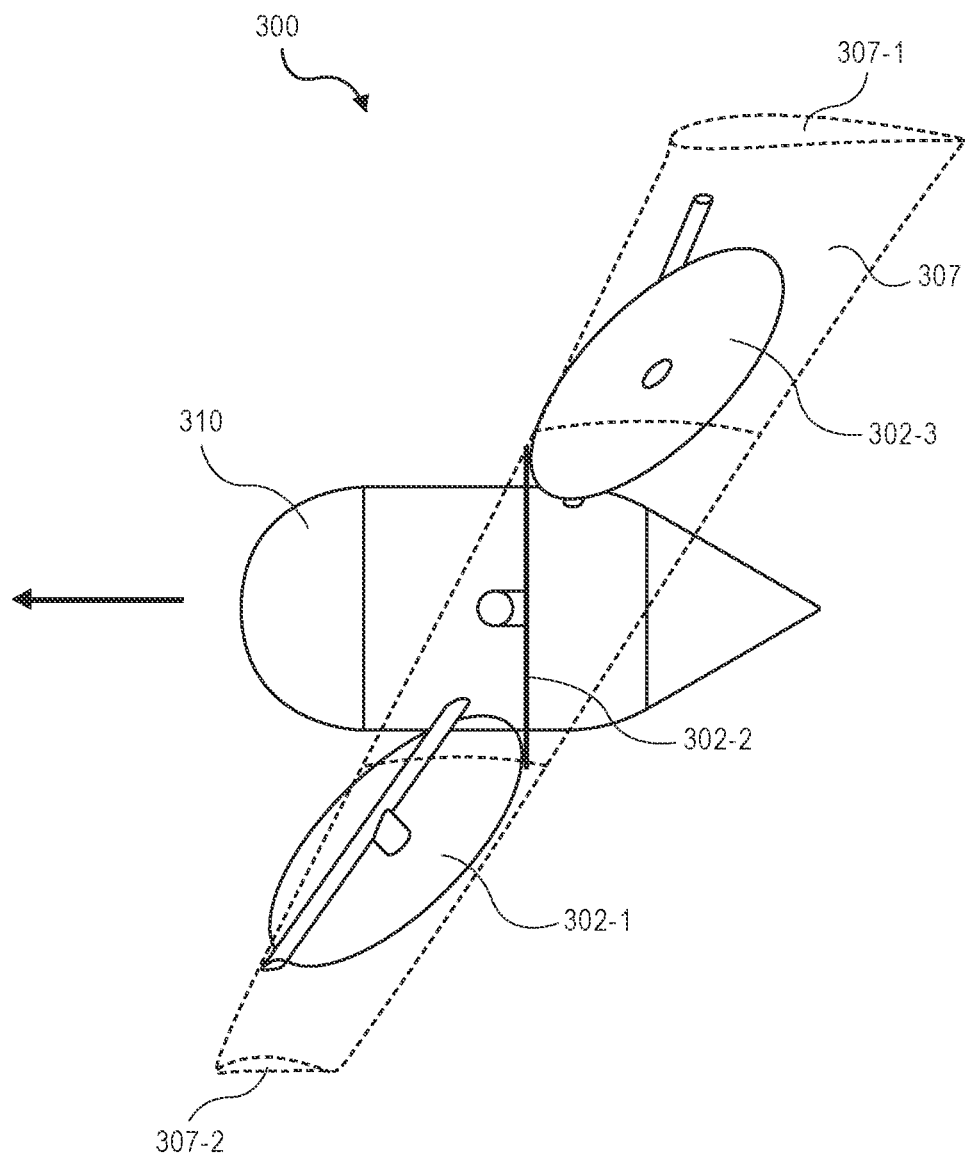

FIG. 3 is a side view of an aerial vehicle 300 with a ring wing 307, in accordance with disclosed implementations. The aerial vehicle 300 corresponds to the aerial vehicle 100 discussed in FIG. 1 and aerial vehicle 200 discussed in FIG. 2. As illustrated, when the aerial vehicle is oriented for horizontal flight, as illustrated in FIG. 3, the fuselage 310 is oriented horizontally and two of the propulsion mechanisms, propulsion mechanism 302-2 and the propulsion mechanism on the opposing side of the fuselage and illustrated in FIG. 1, are oriented to produce thrust in a substantially horizontal direction. In comparison, the other propulsion mechanisms, such as propulsion mechanisms 302-1 and 302-3, are not oriented to produce forces in substantially the horizontal direction. During horizontal flight, the propulsion mechanisms, such as propulsion mechanisms 302-1 and 302-3, may be disabled and/or used to produce maneuverability forces that will cause the aerial vehicle to pitch, yaw, and/or roll as it aerially navigates in a substantially horizontal direction. In some implementations, the propulsion mechanisms that are not aligned to produce substantially horizontal forces may be allowed to freely rotate in the wind and energy produced from the rotation may be used to charge the power module of the aerial vehicle 300.

The ring wing 307 is angled such that the lower portion 307-2 of the ring wing is positioned ahead of the upper portion 307-1 of the ring wing 307. Because the leading wing, lower portion 307-2 produces a much higher lift per square inch than the rear wing, upper portion 307-1, and the chord length of the lower portion 307-2 is less than the chord length of the upper portion 307-1. Likewise, as illustrated, the upper portion 307-1 of the ring wing has a different camber than the lower portion 307-2. The chord length and camber transition from that illustrated along the upper portion 307-1 to the lower portion 307-2. While the sides of the ring wing provide some lift, at the midpoint of each side, there is minimal lift produced by the ring wing 307.

In addition to providing lift, the ring wing 307 provides a protective barrier or shroud that surrounds the propulsion mechanisms of the aerial vehicle 300. The protective barrier of the ring wing 307 increases the safety of the aerial vehicle. For example, if the aerial vehicle comes into contact with another object, there is a higher probability that the object will contact the ring wing, rather than a propulsion mechanism.

Figure 4:
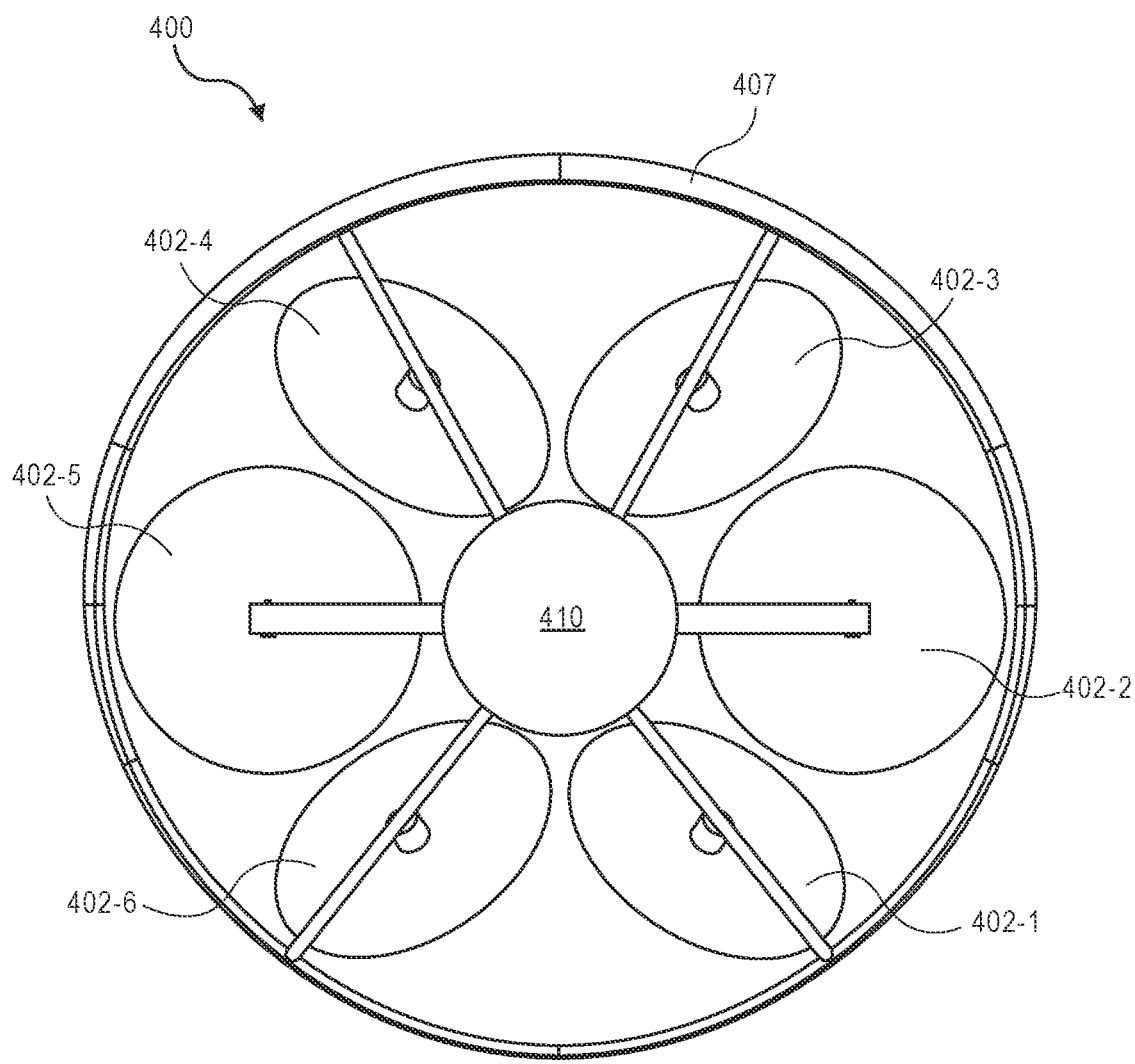

FIG. 4 is a front-on view of an aerial vehicle 400 with a ring wing 407, according to disclosed implementations. The aerial vehicle 400 corresponds to aerial vehicle 100 of FIG. 1, aerial vehicle 200 of FIG. 2, and aerial vehicle 300 of FIG. 3. As discussed above with respect to FIG. 3, when the aerial vehicle is oriented for horizontal flight, as illustrated in FIGS. 3 and 4, the fuselage 410 is oriented in the direction of travel, the ring wing 407 is oriented in the direction of travel such that it will produce a lifting force, and propulsion mechanisms 402-2 and 402-5, which are on opposing sides of the fuselage 410, are aligned to produce forces in the substantially horizontal direction to propel or thrust the aerial vehicle horizontally. The other propulsion mechanisms 402-1, 402-3, 402-4, and 402-6 are offset and may be disabled, used to produce maneuverability forces, and/or allowed to freely rotate and produce energy that is used to charge a power module of the aerial vehicle 400. By increasing the thrust produced by each of the propulsion mechanisms 402-2 and 402-5, the horizontal speed of the aerial vehicle increases. Likewise, the lifting force from the ring wing 407 also increases. In some implementations, as discussed further below, one or more ailerons may be included on the surface of the ring wing and used to control the aerial navigation of the aerial vehicle during horizontal flight.

As discussed below, to transition the aerial vehicle from a VTOL orientation, as illustrated in FIG. 2, to a horizontal flight orientation, as illustrated in FIGS. 3 and 4, forces generated by each of the propulsion mechanisms 402 will cause the aerial vehicle to pitch forward and increase in speed in the horizontal direction. As the horizontal speed increases and the pitch increases, the lifting force produced by the airfoil shape of the ring wing will increase which will further cause the aerial vehicle to pitch into the horizontal flight orientation and allow the aerial vehicle to remain airborne.

In contrast, as discussed below, when the aerial vehicle is to transition from a horizontal flight orientation to a VTOL orientation, forces from the propulsion mechanisms may cause the aerial vehicle to decrease pitch and reduce horizontal speed. As the pitch of the aerial vehicle decreases, the lift produced by the airfoil shape of the ring wing decreases and the thrust produced by each of the six propulsion mechanisms 402 are utilized to maintain flight of the aerial vehicle 400.

As illustrated in FIGS. 1-4, each of the propulsion mechanisms 402 are positioned in approximately the same plane that is substantially aligned with the ring wing. Likewise, each propulsion mechanism 402 is spaced approximately sixty degrees from each other around the fuselage 410, such that the propulsion mechanisms are positioned at approximately equal distances with respect to one another and around the fuselage 410 of the aerial vehicle 400. For example, the second propulsion mechanism 402-2 and the fifth propulsion mechanism 402-5 may each be positioned along the X axis. The third propulsion mechanism 402-3 may be positioned at approximately sixty degrees from the X axis and the fourth propulsion mechanism 402-4 may be positioned approximately one-hundred and twenty degrees from the X axis. Likewise, the first propulsion mechanism 402-1 and the sixth propulsion mechanism 402-6 may likewise be positioned approximately sixty and one-hundred and twenty degrees from the X axis in the negative direction.

In other implementations, the spacing between the propulsion mechanisms may be different. For example, propulsion mechanisms 402-1, 402-3, and 402-5, which are oriented in the first direction, may each be approximately equally spaced 120 degrees apart and propulsion mechanisms 402-2, 402-4, and 402-6, which are oriented in the second direction, may also be approximately equally spaced 120 degrees apart. However, the spacing between propulsion mechanisms oriented in the first direction and propulsion mechanisms oriented in the second direction may not be equal. For example, the propulsion mechanisms 402-1, 402-3, and 402-5 oriented in the first direction, may be positioned at approximately zero degrees, approximately 120 degrees, and approximately 240 degrees around the perimeter of the aerial vehicle with respect to the X axis, and the propulsion mechanisms 402-2, 402-4, and 402-6, oriented in the second direction, may be positioned at approximately 10 degrees, approximately 130 degrees, and approximately 250 degrees around the perimeter of the aerial vehicle 400 with respect to the X axis.

In other implementations, the propulsion mechanisms may have other alignments. Likewise, in other implementations, there may be fewer or additional propulsion mechanisms. Likewise, in some implementations, the propulsion mechanisms may not all be aligned in the same plane and/or the ring wing may be in a different plane than some or all of the propulsion mechanisms.

While the examples discussed above and illustrated in FIGS. 1-4 discuss rotating the propulsion mechanisms approximately thirty degrees about each respective motor arm and that the ring wing is offset approximately thirty degrees with respect to the fuselage, in other implementations, the orientation of the propulsion mechanisms and/or the ring wing may be greater or less than thirty degrees and the angle of the ring wing may be different than the angle of one or more propulsion mechanisms. In some implementations, if maneuverability of the aerial vehicle when the aerial vehicle is in VTOL orientation is of higher importance, the orientation of the propulsion mechanisms may be higher than thirty degrees. For example, each of the propulsion mechanisms may be oriented approximately forty-five degrees about each respective motor arm, in either the first or second direction. In comparison, if lifting force of the aerial vehicle when the aerial vehicle is in the VTOL orientation is of higher importance, the orientation of the propulsion mechanisms may be less than thirty degrees. For example, each propulsion mechanism may be oriented approximately ten degrees from a vertical orientation about each respective motor arm.

In some implementations, the orientations of some propulsion mechanisms may be different than other propulsion mechanisms. For example, propulsion mechanisms 402-1, 402-3, and 402-5 may each be oriented approximately fifteen degrees in the first direction and propulsion mechanisms 402-2, 402-4, and 402-6 may be oriented approximately twenty-five degrees in the second direction. In still other examples, pairs of propulsion mechanisms may have different orientations than other pairs of propulsion mechanisms. For example, propulsion mechanisms 402-1 and 402-6 may each be oriented approximately thirty degrees in the first direction and second direction, respectively, toward one another, propulsion mechanisms 402-3 and 402-2 may each be oriented approximately forty-five degrees in the first direction and second direction, respectively, toward one another, and propulsion mechanisms 402-5 and 402-4 may each be oriented approximately forty-five degrees in the first direction and second direction, respectively, toward one another.

As discussed below, by orienting propulsion mechanisms partially toward one another in pairs, as illustrated, the lateral or horizontal forces generated by the pairs of propulsion mechanisms, when producing the same amount of force, will cancel out such that the sum of the forces from the pair is only in a substantially vertical direction (Z direction), when the aerial vehicle is in the VTOL orientation. Likewise, as discussed below, if one propulsion mechanism of the pair produces a force larger than a second propulsion mechanism, a lateral or horizontal force will result in the X direction and/or the Y direction, when the aerial vehicle is in the VTOL orientation. A horizontal force produced from one or more of the pairs of propulsion mechanisms enables the aerial vehicle to translate in a horizontal direction and/or yaw without altering the pitch of the aerial vehicle, when the aerial vehicle is in the VTOL orientation. Producing lateral forces by multiple pairs of propulsion mechanisms 402 enables the aerial vehicle 400 to operate independently in any of the six degrees of freedom (surge, sway, heave, pitch, yaw, and roll). As a result, the stability and maneuverability of the aerial vehicle 400 is increased.

While the implementations illustrated in FIGS. 1-4 include six arms that extend radially from a central portion of the aerial vehicle and are coupled to the ring wing, in other implementations, there may be fewer or additional arms. For example, the aerial vehicle may include support arms that extend between the arms 105 and provide additional support to the aerial vehicle. As another example, not all of the motor arms may extend to and couple with the ring wing.

Figure 5:
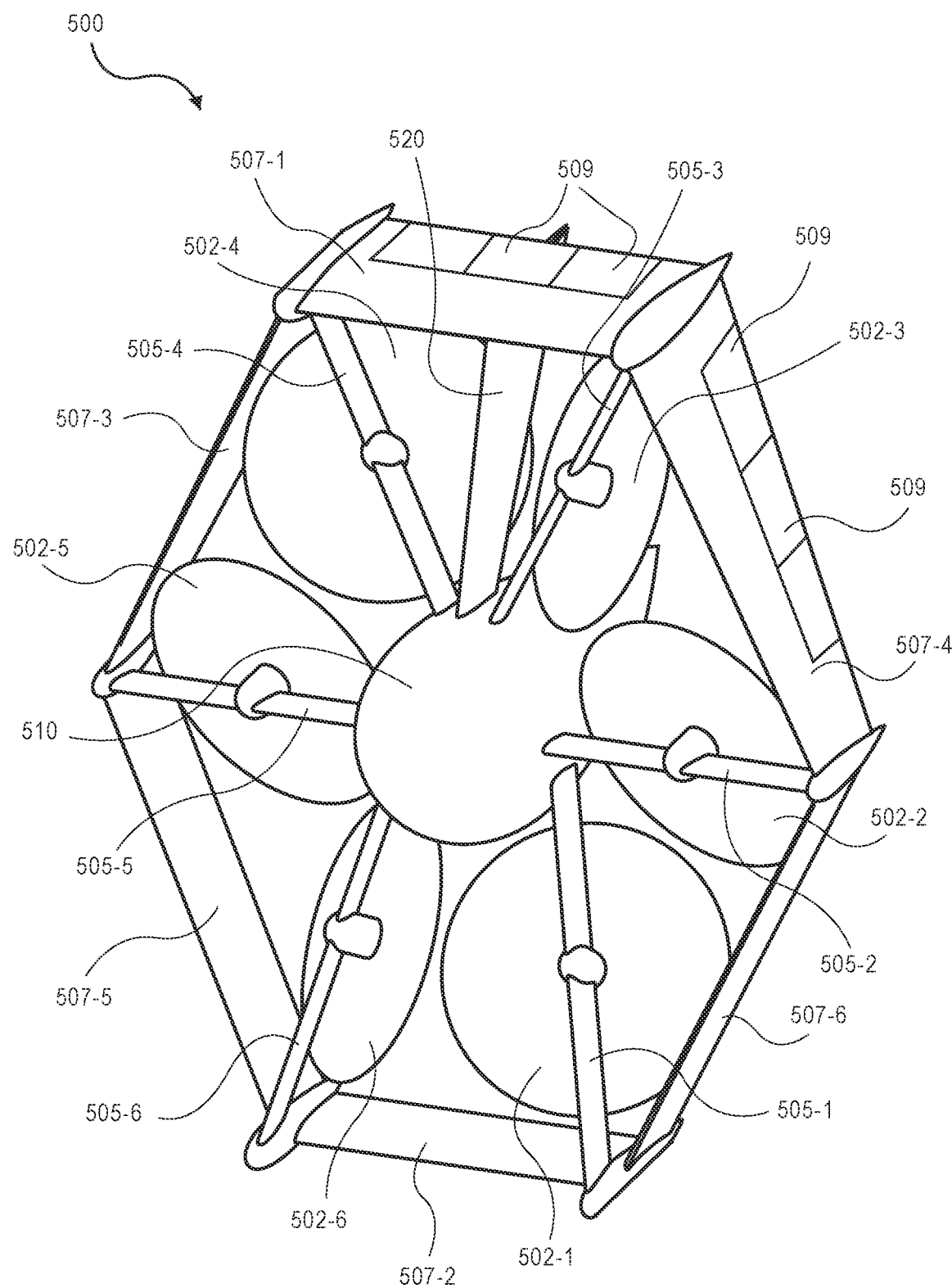
FIGS. 5-8 illustrate various views of an aerial vehicle with a substantially hexagonal shaped ring wing, in accordance with disclosed implementations.

FIG. 5 illustrates a view of an aerial vehicle 500 with a ring wing that is substantially hexagonal in shape and that surrounds a plurality of propulsion mechanisms, according to disclosed implementations. Similar to the aerial vehicle discussed with respect to FIGS. 1-4, the aerial vehicle 500 includes six propulsion mechanisms 502-1, 502-2, 502-3, 502-4, 502-5, and 502-6 spaced about the fuselage 510 of the aerial vehicle 500. As discussed above, while the propulsion mechanisms 502 may include motors and propellers, in other implementations, other forms of propulsion may be utilized as the propulsion mechanisms 502. For example, one or more of the propulsion mechanisms 502 of the aerial vehicle 500 may utilize fans, jets, turbojets, turbo fans, jet engines, and/or the like to maneuver the aerial vehicle. Generally described, a propulsion mechanism 502, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 502-1, 502-2, 502-3, 502-4, 502-5, and 502-6) may be configured such that their individual orientations may be dynamically modified (e.g., change from vertical to horizontal flight orientation) or any position therebetween.

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

In this implementation, the aerial vehicle 500 also includes a ring wing 507 having a substantially hexagonal shape that extends around and forms the perimeter of the aerial vehicle 500. In the illustrated example, the ring wing has six segments 507-1, 507-2, 507-3, 507-4, 507-5, and 507-6 that are joined at adjacent ends to form the ring wing 507 around the aerial vehicle 500. Each segment of the ring wing 507 has an airfoil shape to produce lift when the aerial vehicle is oriented as illustrated in FIG. 5 and moving in a direction that is substantially horizontal. As illustrated, and discussed further below, the ring wing is positioned at an angle with respect to the fuselage 510 such that the lower segment 507-2 of the ring wing acts as a front wing as it is toward the front of the aerial vehicle when oriented as shown and moving in a horizontal direction. The upper segment 507-1 of the ring wing, which has a longer chord length than the lower segment 507-2 of the ring wing 507, is farther back and thus acts as a rear wing.

The ring wing 507 is secured to the fuselage 510 by motor arms 505. In this example, all six motor arms 505-1, 505-2, 505-3, 505-4, 505-5, and 505-6 are coupled to the fuselage at one end, extend from the fuselage 510 and couple to the ring wing 507 at a second end, thereby securing the ring wing 507 to the fuselage. In other implementations, less than all of the motor arms may extend from the fuselage 510 and couple to the ring wing 507. For example, motor arms 505-2 and 505-5 may be coupled to the fuselage 510 at one end and extend outward from the fuselage but not couple to the ring wing 507.

In some implementations, the aerial vehicle may also include one or more stabilizer fins 520 that extend from the fuselage 510 to the ring wing 507. The stabilizer fin 520 may also have an airfoil shape. In the illustrated example, the stabilizer fin 520 extends vertically from the fuselage 510 to the ring wing 507. In other implementations, the stabilizer fin may be at other positions. For example, the stabilizer fin may extend downward from the fuselage between motor arm 505-1 and motor arm 505-6.

In general, one or more stabilizer fins may extend from the fuselage 510, between any two motor arms 505 and couple to an interior of the ring wing 507. For example, stabilizer fin 520 may extend upward between motor arms 505-3 and 505-4, a second stabilizer fin may extend from the fuselage and between motor arms 505-5 and 505-6, and a third stabilizer fin may extend from the fuselage and between motor arms 505-1 and 505-2.

Likewise, while the illustrated example shows the stabilizer fin extending from the fuselage 510 at one end and coupling to the interior of the ring wing 507 at a second end, in other implementations, one or more of the stabilizer fin(s) may extend from the fuselage and not couple to the ring wing or may extend from the ring wing and not couple to the fuselage. In some implementations, one or more stabilizer fins may extend from the exterior of the ring wing 507, one or more stabilizer fins may extend from the interior of the ring wing 507, one or more stabilizer fins may extend from the fuselage 510, and/or one or more stabilizer fins may extend from the fuselage 510 and couple to the interior of the ring wing 507.

The fuselage 510, motor arms 505, stabilizer fin 520, and ring wing 507 of the aerial vehicle 500 may be formed of any one or more suitable materials, such as graphite, carbon fiber, and/or aluminum.

Each of the propulsion mechanisms 502 are coupled to a respective motor arm 505 such that the propulsion mechanism 502 is substantially contained within the perimeter ring wing 507. For example, propulsion mechanism 502-1 is coupled to motor arm 505-1, propulsion mechanism 502-2 is coupled to motor arm 505-2, propulsion mechanism 502-3 is coupled to motor arm 505-3, propulsion mechanism 502-4 is coupled to motor arm 505-4, propulsion mechanism 502-5 is coupled to motor arm 505-5, and propulsion mechanism 502-6 is coupled to motor arm 505-6. In the illustrated example, each propulsion mechanism 502-1, 502-3, 502-4, and 502-6 is coupled at an approximate mid-point of the respective motor arm 505-1, 505-3, 505-4, and 505-6 between the fuselage 510 and the ring wing 507. In comparison, propulsion mechanisms 502-2 and 502-5 are coupled toward an end of the respective motor arm 505-2 and 505-5. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 510 or closer toward the ring wing 507).

As illustrated, the propulsion mechanisms 502 may be oriented at different angles with respect to each other. For example, propulsion mechanisms 502-2 and 502-5 are aligned with the fuselage 510 such that the force generated by each of propulsion mechanisms 502-2 and 502-5 is in-line or in the same direction or orientation as the fuselage. In the illustrated example, the aerial vehicle 500 is oriented for horizontal flight such that the fuselage is oriented horizontally in the direction of travel. In such an orientation, the propulsion mechanisms 502-2 and 502-5 provide horizontal forces, also referred to herein as thrusting forces and act as thrusting propulsion mechanisms.

In comparison to propulsion mechanisms 502-2 and 502-5, each of propulsion mechanisms 502-1, 502-3, 502-4, and 502-6 are offset or angled with respect to the orientation of the fuselage 510. When the aerial vehicle 500 is oriented horizontally as shown in FIG. 5 for horizontal flight, the propulsion mechanisms 502-1, 502-3, 502-4, and 502-6 may be used as propulsion mechanisms, providing thrust in a non-horizontal direction to cause the aerial vehicle to pitch, yaw, roll, heave and/or sway. In other implementations, during horizontal flight, the propulsion mechanisms 502-1, 502-3, 502-4, and 502-6 may be disabled such that they do not produce any forces and the aerial vehicle 500 may be propelled aerially in a horizontal direction as a result of the lifting force from the aerodynamic shape of the ring wing 507 and the horizontal thrust produced by the thrusting propulsion mechanisms 502-2 and 502-5.

In some implementations, one or more segments of the ring wing 507 may include ailerons 509 that may be adjusted to control the aerial flight of the aerial vehicle 500. For example, one or more ailerons 509 may be included on the upper segment 507-1 of the ring wing 507 and/or one or more ailerons 509 may be included on the side segments 507-4 and/or 507-3. The ailerons 509 may be operable to control the pitch, yaw, and/or roll of the aerial vehicle during horizontal flight when the aerial vehicle 500 is oriented as illustrated in FIG. 5.

The angle of orientation of each of the propulsion mechanisms 502-1, 502-2, 502-3, 502-4, 502-5, and 502-6 may vary for different implementations. Likewise, in some implementations, the offset of the propulsion mechanisms 502-1, 502-2, 502-3, 502-4, 502-5, and 502-6 may each be the same, with some oriented in one direction and some oriented in another direction, may each be oriented different amounts, and/or in different directions.

In the illustrated example of FIG. 5, each propulsion mechanism 502-1, 502-2, 502-3, 502-4, 502-5, and 502-6 may be oriented approximately thirty degrees with respect to the position of each respective motor arm 505-1, 505-2, 505-3, 505-4, 505-5, and 505-6. In addition, the direction of orientation of the propulsion mechanisms is such that pairs of propulsion mechanisms are oriented toward one another. For example, propulsion mechanism 502-1 is oriented approximately thirty degrees toward propulsion mechanism 502-6. Likewise, propulsion mechanism 502-2 is oriented approximately thirty degrees in a second direction about the second motor arm 505-2 and oriented toward propulsion mechanism 502-3. Finally, propulsion mechanism 502-4 is oriented approximately thirty degrees in the first direction about the fourth motor arm 505-4 and toward propulsion 502-5. As illustrated, propulsion mechanisms 502-3 and 502-6, which are on opposing sides of the fuselage 510, are aligned and oriented in a same first direction (in this example, horizontal). Propulsion mechanisms 502-2 and 502-5, which are on opposing sides of the fuselage 510, are aligned and oriented in a same second direction, which is angled compared to the first direction. Propulsion mechanisms 502-1 and 502-4, which are on opposing sides of the fuselage 510, are aligned and oriented in a same third direction, which is angled compared to the first direction and the second direction.

Figure 6:
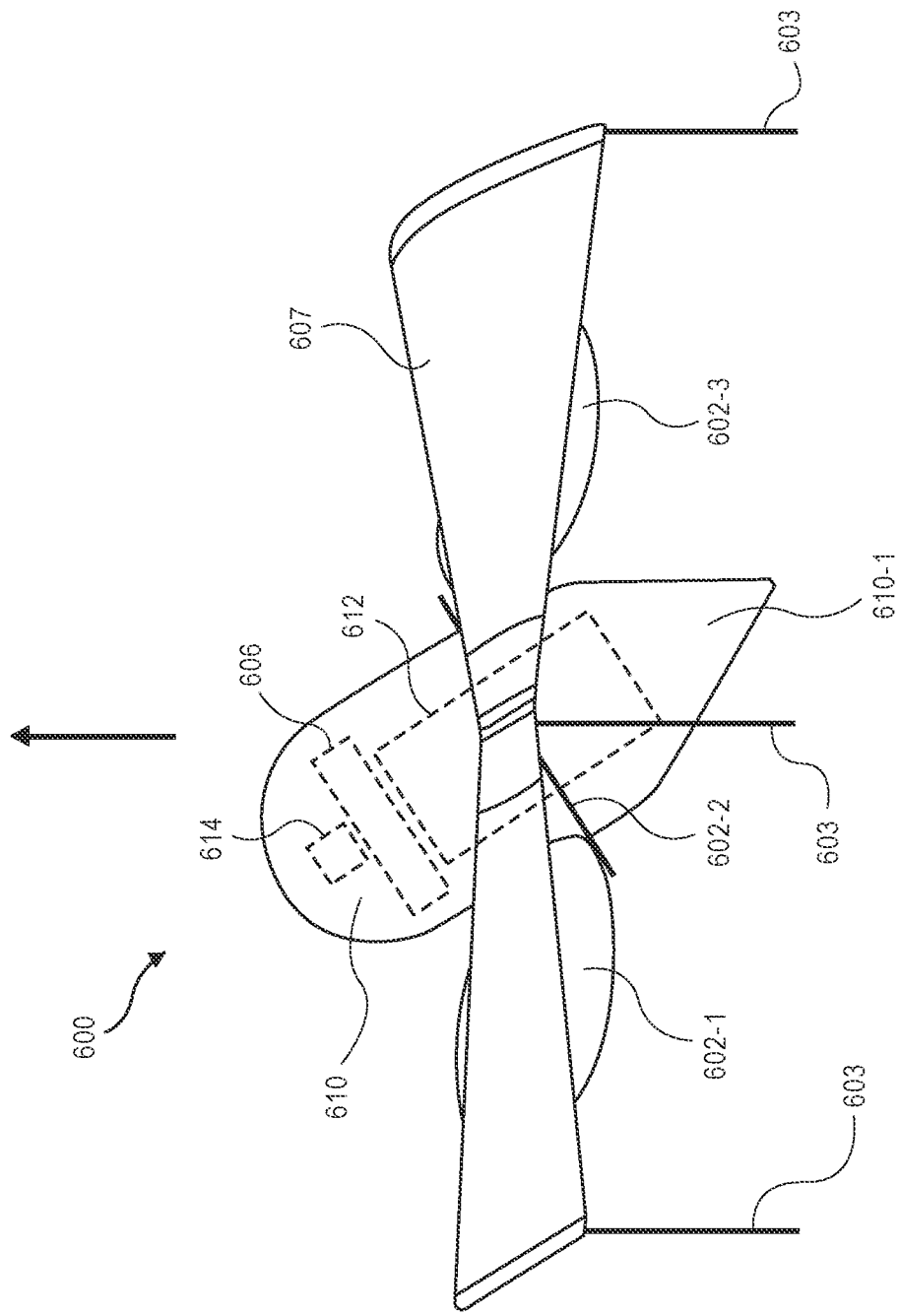

FIG. 6 illustrates a side view of the aerial vehicle 600 oriented for vertical takeoff and landing (VTOL), in accordance with disclosed implementations. The aerial vehicle 600 corresponds to the aerial vehicle 500 discussed above with respect to FIG. 5. When oriented as illustrated in FIG. 6, the aerial vehicle may maneuver in any of the six degrees of freedom (pitch, yaw, roll, heave, surge, and sway), thereby enabling VTOL and high maneuverability.

As illustrated, when the aerial vehicle is oriented for VTOL, the motor arms and the ring wing 607 are aligned approximately horizontally and in the same plane. In this orientation, each of the propulsion mechanisms are offset or angled with respect to the horizontal and/or vertical direction. As such, each propulsion mechanism 602, when generating a force, generates a force that includes both a horizontal component and a vertical component. In the illustrated example, each propulsion mechanism is angled approximately thirty degrees with respect to vertical. Likewise, as discussed above, adjacent propulsion mechanisms are angled in opposing directions to form pairs of propulsion mechanisms. For example, propulsion mechanism 602-2 is oriented toward propulsion mechanism 602-3. As discussed further below, angling adjacent propulsion mechanisms toward one another to form pairs of propulsion mechanisms allows horizontal forces from each propulsion mechanism to cancel out such that the pair of propulsion mechanisms can produce a vertical force. Likewise, if one of the propulsion mechanisms of a pair of propulsion mechanisms is producing a larger force than the other propulsion mechanism of the pair, a net horizontal force will result from the pair of propulsion mechanisms. Accordingly, when the aerial vehicle 600 is oriented for VTOL with angled propulsion mechanisms, as illustrated in FIG. 6, the aerial vehicle can move independently in any of the six degrees of freedom. For example, if the aerial vehicle is to surge in the X direction, it can do so by altering the forces produced by the propulsion mechanisms to generate a net horizontal force in the X direction without having to pitch forward to enable a surge in the X direction.

To enable the fuselage to be oriented horizontally with an offset ring wing 607 during horizontal flight, as illustrated in FIG. 5, the fuselage is rotated at an angle when the aerial vehicle 600 is oriented for VTOL, as illustrated in FIG. 6. In this example the fuselage 610 is angled at approximately thirty degrees from vertical. In other implementations, the amount of rotation from vertical may be greater or less depending on the amount of offset desired for the ring wing 607 when the aerial vehicle 600 is oriented for horizontal flight.

The aerial vehicle may also include one or more landing gears 603 that are extendable to a landing position, as illustrated in FIG. 6. During flight, the landing gear 603 may be retracted into the interior of the ring wing 607 and/or may be rotated up and remain along the trailing edge of the ring wing. In still other examples, the landing gear may be permanently affixed.

The fuselage 610 may be used to store one or more components of the aerial vehicle, such as the aerial vehicle control system 614, power module 606, and/or a payload 612 that is transported by the aerial vehicle. The aerial vehicle control system is discussed further below. The power module(s) 606 may be removably mounted to the aerial vehicle 600. The power module(s) 606 for the aerial vehicle may be, for example, in the form of battery power, solar power, gas power, super capacitor, fuel cell, alternative power generation source, or a combination thereof. The power module(s) 606 are coupled to and provide power for the aerial vehicle control system 614, the propulsion mechanisms 602, and the payload engagement module 610-1.

In some implementations, one or more of the power modules may be configured such that it can be autonomously removed and/or replaced with another power module. For example, when the aerial vehicle lands at a delivery location, relay location and/or materials handling facility, the aerial vehicle may engage with a charging member at the location that will recharge the power module.

The payload 612 may be any payload that is to be transported by the aerial vehicle. In some implementations, the aerial vehicle may be used to aerially deliver items ordered from customers for aerial delivery and the payload may include one or more customer ordered items. For example, a customer may order an item from an electronic commerce website and the item may be delivered to a customer specified delivery location using the aerial vehicle 600.

In some implementations, the fuselage 610 may include a payload engagement module 610-1. For example, the payload engagement module 610-1 may be a hinged portion of the fuselage 610 that can rotate between an open position, in which the interior of the fuselage is accessible so that the payload 612 may be added to or removed from the fuselage, and a closed position, as illustrated in FIG. 6, so that the payload 612 is secured within the interior of the fuselage.

Figure 7:
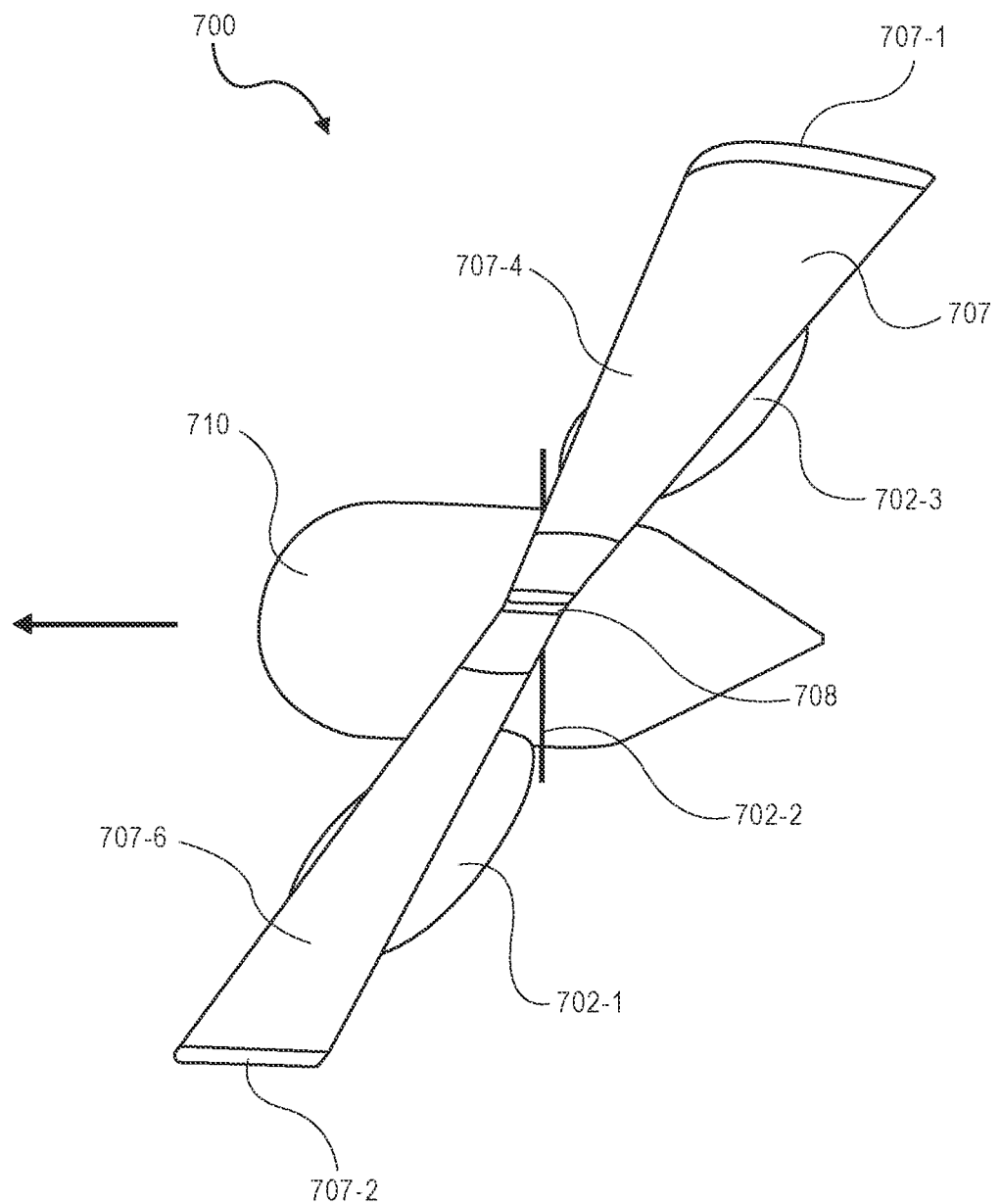

FIG. 7 is a side view of an aerial vehicle 700 with a ring wing 707, in accordance with disclosed implementations. The aerial vehicle 700 corresponds to the aerial vehicle 500 discussed in FIG. 5 and aerial vehicle 600 discussed in FIG. 6. As illustrated, when the aerial vehicle is oriented for horizontal flight, as illustrated in FIG. 7, the fuselage 710 is oriented horizontally and two of the propulsion mechanisms, propulsion mechanism 702-2 and the propulsion mechanism on the opposing side of the fuselage and illustrated in FIG. 5, are oriented to produce thrust in a substantially horizontal direction. In comparison, the other propulsion mechanisms, such as propulsion mechanisms 702-1 and 702-3 are not oriented to produce forces in substantially the horizontal direction. During horizontal flight, the propulsion mechanisms, such as propulsion mechanism 702-1 and 702-3 may be disabled and/or used to produce maneuverability forces that will cause the aerial vehicle to pitch, yaw, and/or roll as it aerially navigates in a substantially horizontal direction. In some implementations, the propulsion mechanisms that are not aligned to produce substantially horizontal forces may be allowed to freely rotate in the wind and energy produced from the rotation may be used to charge the power module of the aerial vehicle 700.

The ring wing 707 is angled such that the lower segment 707-2 of the ring wing is positioned ahead of the upper segment 707-1 of the ring wing 707. Because the leading wing, lower segment 707-2 produces a much higher lift per square inch than the rear wing, upper segment 707-1, the chord length of the lower segment 707-2 is less than the chord length of the upper segment 707-1. Likewise, as illustrated, the upper segment 707-1 of the ring wing has a different camber than the lower segment 707-2. The chord length and camber transition from that illustrated along the upper segment 707-1 to the lower segment 707-2. In implementations that include one or more stabilizer fins, such as stabilizer fin 520 (FIG. 5), the difference between the chord length of the lower segment 707-2 and the upper segment 707-1 may be less and/or the difference between the camber of the lower segment 707-2 and the upper segment 707-1 may be less.

While the side segments, such as side segment 707-4 and segment 707-6 of the ring wing provide some lift, at the midpoint 708 of each side segment there is minimal lift produced by the ring wing 707. Because there is minimal lift produced at the midpoint 708, the segments may be tapered to reduce the overall weight of the aerial vehicle. In this example, the side segments, such as side segments 707-4 and 707-6, are tapered toward the mid-point but retain some dimension for structural integrity and to operate as a protective barrier around the propulsion mechanisms 702. While the illustrated examples show both side segments 707-4 and 707-6 tapering to a smaller end at the midpoint 708, in other implementations, the taper may be consistent from the larger top segment 707-1 to the smaller lower segment 707-2.

In addition to providing lift, the ring wing 707 provides a protective barrier or shroud that surrounds the propulsion mechanisms of the aerial vehicle 700. The protective barrier of the ring wing 707 increases the safety of the aerial vehicle. For example, if the aerial vehicle comes into contact with another object, there is a higher probability that the object will contact the ring wing, rather than a propulsion mechanism.

Figure 8:
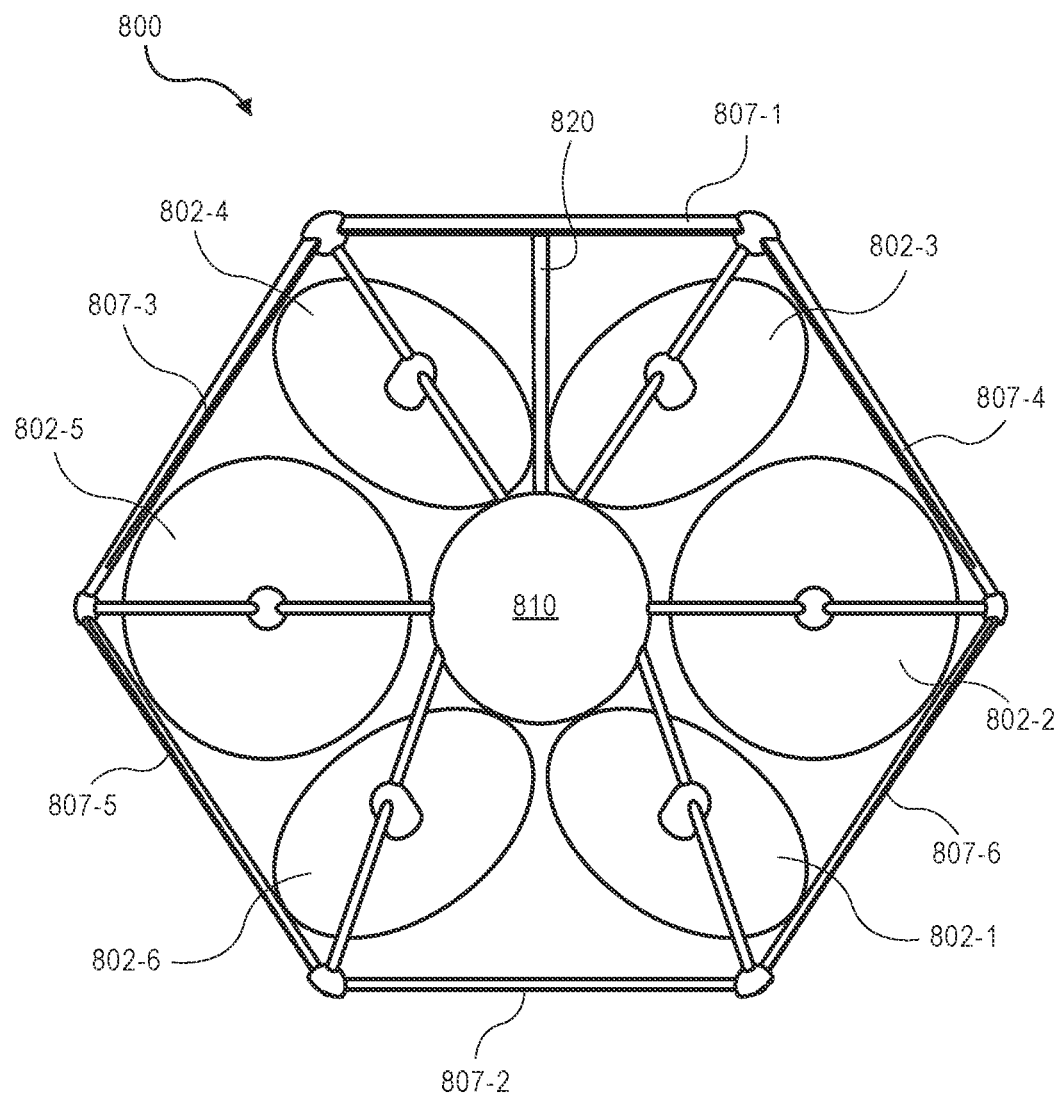

FIG. 8 is a front-on view of an aerial vehicle 800 with a ring wing 807 having a substantially hexagonal shape, according to disclosed implementations. The aerial vehicle 800 corresponds to aerial vehicle 500 of FIG. 5, aerial vehicle 600 of FIG. 6, and aerial vehicle 700 of FIG. 7. As discussed above with respect to FIG. 7, when the aerial vehicle is oriented for horizontal flight, as illustrated in FIGS. 7 and 8, the fuselage 810 is oriented in the direction of travel, the ring wing 807 is oriented in the direction of travel such that it will produce a lifting force, and propulsion mechanisms 802-2 and 802-5, which are on opposing sides of the fuselage 810, are aligned to produce forces in the substantially horizontal direction to propel or thrust the aerial vehicle horizontally. The other propulsion mechanisms 802-1, 802-3, 802-4, and 802-6 are offset and may be disabled, used to produce maneuverability forces, and/or allowed to freely rotate and produce energy that is used to charge a power module of the aerial vehicle 800. By increasing the thrust produced by each of the propulsion mechanisms 802-2 and 802-5, the horizontal speed of the aerial vehicle increases. Likewise, the lifting force from the ring wing 807 also increases. In some implementations, one or more ailerons, such as those discussed above with respect to FIG. 5, may be included on the surface of the ring wing and used to control the aerial navigation of the aerial vehicle during horizontal flight. Likewise, one or more stabilizer fins 820 may be included to stabilize the aerial vehicle during horizontal flight.

In some implementations, the hexagonal shaped ring wing may decrease manufacturing costs, provide for more stable flight, and provide flatter surfaces upon which control elements, such as ailerons, may be included. Likewise, other components may be coupled to the surface of the ring wing. Other components include, but are not limited to, sensors, imaging elements, range finders, identifying markers, navigation components, such as global positioning satellite antennas, antennas, etc.

As discussed below, to transition the aerial vehicle from a VTOL orientation, as illustrated in FIG. 6, to a horizontal flight orientation, as illustrated in FIGS. 7 and 8, forces generated by each of the propulsion mechanisms 802 will cause the aerial vehicle to pitch forward and increase in speed in the horizontal direction. As the horizontal speed increases and the pitch increases, the lifting force produced by the airfoil shape of the ring wing will increase which will further cause the aerial vehicle to pitch into the horizontal flight orientation and allow the aerial vehicle to remain airborne.

In contrast, as discussed below, when the aerial vehicle is to transition from a horizontal flight orientation to a VTOL orientation, forces from the propulsion mechanisms may cause the aerial vehicle to decrease pitch and reduce horizontal speed. As the pitch of the aerial vehicle decreases, the lift produced by the airfoil shape of the ring wing decreases and the thrust produced by each of the six propulsion mechanisms 802 are utilized to maintain flight of the aerial vehicle 800.

As illustrated in FIGS. 5-8, each of the propulsion mechanisms 802 are positioned in approximately the same plane that is substantially aligned with the ring wing. Likewise, each propulsion mechanism 802 is spaced approximately sixty degrees from each other around the fuselage 810, such that the propulsion mechanisms are positioned at approximately equal distances with respect to one another and around the fuselage 810 of the aerial vehicle 800. For example, the second propulsion mechanism 802-2 and the fifth propulsion mechanism 802-5 may each be positioned along the X axis. The third propulsion mechanism 802-3 may be positioned at approximately sixty degrees from the X axis and the fourth propulsion mechanism 802-4 may be positioned approximately one-hundred and twenty degrees from the X axis. Likewise, the first propulsion mechanism 802-1 and the sixth propulsion mechanism 802-6 may likewise be positioned approximately sixty and one-hundred and twenty degrees from the X axis in the negative direction.

In other implementations, the spacing between the propulsion mechanisms may be different. For example, propulsion mechanisms 802-1, 802-3, and 802-5, which are oriented in the first direction, may each be approximately equally spaced 120 degrees apart and propulsion mechanisms 802-2, 802-4, and 802-6, which are oriented in the second direction, may also be approximately equally spaced 120 degrees apart. However, the spacing between propulsion mechanisms oriented in the first direction and propulsion mechanisms oriented in the second direction may not be equal. For example, the propulsion mechanisms 802-1, 802-3, and 802-5, oriented in the first direction, may be positioned at approximately zero degrees, approximately 120 degrees, and approximately 240 degrees around the perimeter of the aerial vehicle with respect to the X axis, and the propulsion mechanisms 802-2, 802-4, and 802-6, oriented in the second direction, may be positioned at approximately 10 degrees, approximately 130 degrees, and approximately 250 degrees around the perimeter of the aerial vehicle 800 with respect to the X axis.

In other implementations, the propulsion mechanisms may have other alignments. Likewise, in other implementations, there may be fewer or additional propulsion mechanisms. Likewise, in some implementations, the propulsion mechanisms may not all be aligned in the same plane and/or the ring wing may be in a different plane than some or all of the propulsion mechanisms.

While the examples discussed above and illustrated in FIGS. 5-8 discuss rotating the propulsion mechanisms approximately thirty degrees about each respective motor arm and that the ring wing is offset approximately thirty degrees with respect to the fuselage, in other implementations, the orientation of the propulsion mechanisms and/or the ring wing may be greater or less than thirty degrees and the angle of the ring wing may be different than the angle of one or more propulsion mechanisms. In some implementations, if maneuverability of the aerial vehicle when the aerial vehicle is in VTOL orientation is of higher importance, the orientation of the propulsion mechanisms may be higher than thirty degrees. For example, each of the propulsion mechanisms may be oriented approximately forty-five degrees about each respective motor arm, in either the first or second direction. In comparison, if the lifting force of the aerial vehicle when the aerial vehicle is in the VTOL orientation is of higher importance, the orientation of the propulsion mechanisms may be less than thirty degrees. For example, each propulsion mechanism may be oriented approximately ten degrees from a vertical orientation about each respective motor arm.

In some implementations, the orientations of some propulsion mechanisms may be different than other propulsion mechanisms. For example, propulsion mechanisms 802-1, 802-3, and 802-5 may each be oriented approximately fifteen degrees in the first direction and propulsion mechanisms 802-2, 802-4, and 802-6 may be oriented approximately twenty-five degrees in the second direction. In still other examples, pairs of propulsion mechanisms may have different orientations than other pairs of propulsion mechanisms. For example, propulsion mechanisms 802-1 and 802-6 may each be oriented approximately thirty degrees in the first direction and second direction, respectively, toward one another, propulsion mechanisms 802-3 and 802-2 may each be oriented approximately forty-five degrees in the first direction and second direction, respectively, toward one another, and propulsion mechanisms 802-5 and 802-4 may each be oriented approximately forty-five degrees in the first direction and second direction, respectively, toward one another.

As discussed below, by orienting propulsion mechanisms partially toward one another in pairs, as illustrated, the lateral or horizontal forces generated by the pairs of propulsion mechanisms, when producing the same amount of force, will cancel out such that the sum of the forces from the pair is only in a substantially vertical direction (Z direction), when the aerial vehicle is in the VTOL orientation. Likewise, as discussed below, if one propulsion mechanism of the pair produces a force larger than a second propulsion mechanism, a lateral or horizontal force will result in the X direction and/or the Y direction, when the aerial vehicle is in the VTOL orientation. A horizontal force produced from one or more of the pairs of propulsion mechanisms enables the aerial vehicle to translate in a horizontal direction and/or yaw without altering the pitch of the aerial vehicle, when the aerial vehicle is in the VTOL orientation. Producing lateral forces by multiple pairs of propulsion mechanisms 802 enables the aerial vehicle 800 to operate independently in any of the six degrees of freedom (surge, sway, heave, pitch, yaw, and roll). As a result, the stability and maneuverability of the aerial vehicle 800 is increased.

While the implementations illustrated in FIGS. 5-8 include six arms that extend radially from a central portion of the aerial vehicle and are coupled to the ring wing, in other implementations, there may be fewer or additional arms. For example, the aerial vehicle may include support arms that extend between the arms 505 and provide additional support to the aerial vehicle. As another example, not all of the motor arms may extend to and couple with the ring wing.

While the examples discussed above in FIGS. 1-8 describe a ring wing in either a substantially circular shape (FIGS. 1-4) or a substantially hexagonal shape (FIGS. 5-8), in other implementations, the ring wing may have other shapes. For example, the ring wing may be substantially square, rectangular, pentagonal, octagonal, etc.

Figure 9:
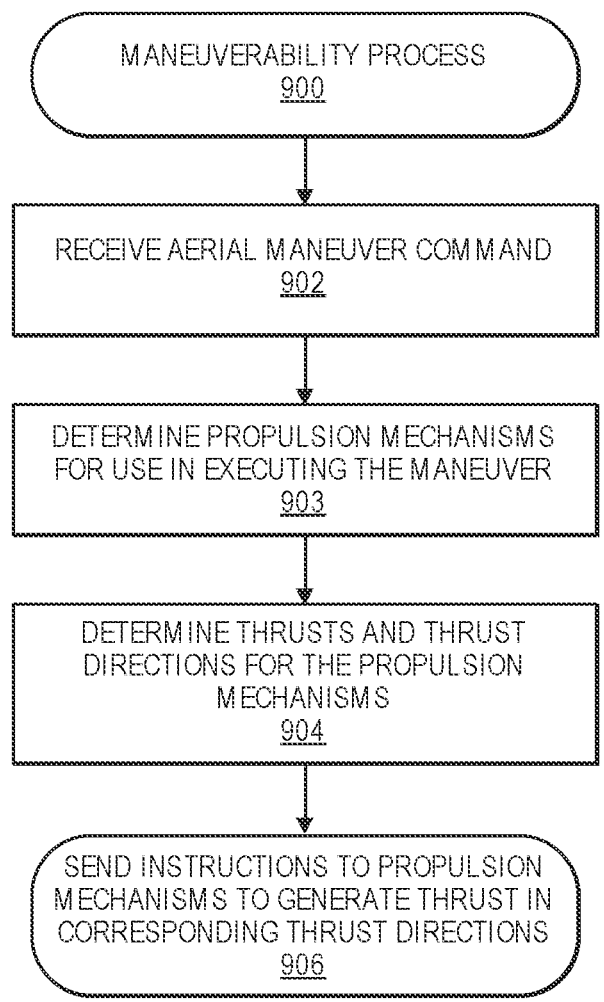
FIG. 9 is a flow diagram illustrating an example maneuverability process, in accordance with disclosed implementations.

FIG. 9 is a flow diagram illustrating an example maneuverability process 900, according to disclosed implementations. The example maneuverability process 900 is performed when the aerial vehicle is in VTOL orientation. The example process 900 begins by receiving an aerial navigation command that includes a maneuver, as in 902. A maneuver may be any command to alter or change an aspect of the aerial vehicle's current flight. For example, a maneuver may be to ascend or descend (heave), increase or decrease speed (surge), move right or left (sway), pitch, yaw, roll, and/or any combination thereof.

Based on the commanded maneuver, the example process determines the propulsion mechanisms to be used in executing the maneuver, as in 903. As discussed herein, the aerial vehicle may include multiple propulsion mechanisms, as discussed herein, that may be selectively used to generate thrusts that will cause the aerial vehicle to execute one or more maneuvers, in any of the six degrees of freedom, when the aerial vehicle is in the VTOL orientation.

In addition to determining the propulsion mechanisms that are to be used to execute the maneuvers, the magnitude and direction of the thrust to be generated by each of the propulsion mechanisms is determined, as in 904. As discussed above, in some implementations, the propulsion mechanisms may be configured to generate forces in either direction in which they are aligned. Alternatively, or in addition thereto, the propulsion mechanisms may be configured such that they are rotatable between two or more positions so that forces generated by the propulsion mechanism may be oriented in different directions. In other implementations, the propulsion mechanisms may be secured at fixed positions on the aerial vehicle.

Based on the determined propulsion mechanisms that are to be used to generate the commanded maneuvers and the determined magnitudes and directions of the forces to be generated by those propulsion mechanisms, instructions are sent to the determined propulsion mechanisms that cause the forces to be generated, as in 906. FIGS. 14-19 illustrate examples of different forces that may be generated by each propulsion mechanism to execute one or more commanded maneuvers in any of the six degrees of freedom.

Figure 10:
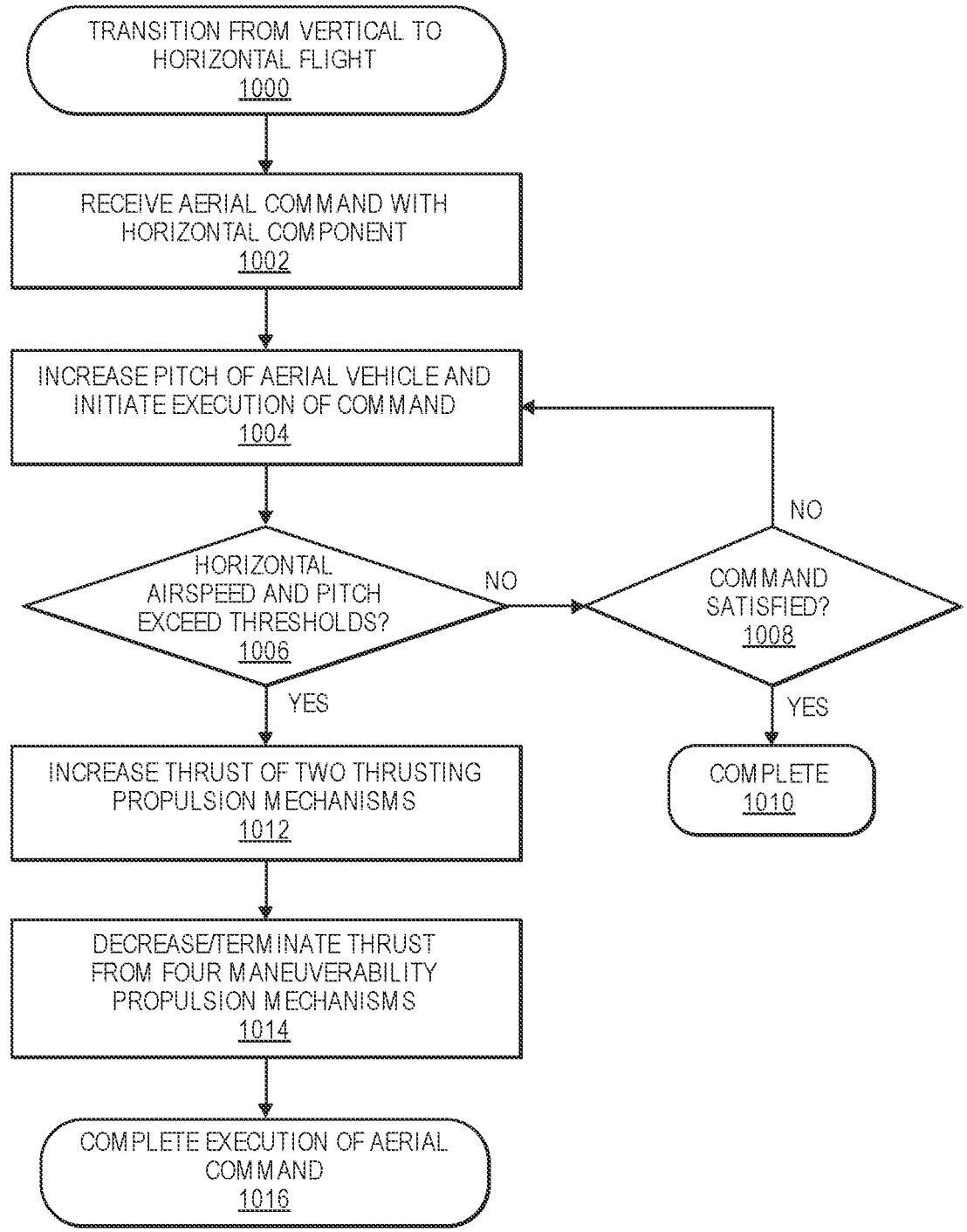
FIG. 10 is a flow diagram illustrating an example transition from vertical flight to horizontal flight process, in accordance with disclosed implementations.

FIG. 10 is a flow diagram illustrating an example transition from vertical flight to horizontal flight process 1000, in accordance with disclosed implementations. The example process may be performed by any of the aerial vehicles discussed herein that include a plurality of propulsion mechanisms and a ring wing surrounding at least a portion of the plurality of propulsion mechanisms, when the aerial vehicle is operating in a VTOL orientation. The example process 1000 begins upon receipt of an aerial command that includes a horizontal component, as in 1002. The command may be received from a remote source, such as a controller, remote computing resource, other aerial vehicle, etc. In other examples, the command may be part of a defined flight path, determined by the aerial vehicle as part of autonomous operation, etc.

Upon receipt of a command with a horizontal component, forces are generated by respective propulsion mechanisms and/or by one or more ailerons of the ring wing that cause the aerial vehicle to pitch forward and increase in speed in the commanded horizontal direction, as in 1004. As discussed further below, different forces may be produced by different propulsion mechanisms that cause a pitching moment about the Y axis and a surge in the X direction.

As the aerial vehicle is pitching forward and surging in the commanded X direction, a determination is made as to whether a horizontal airspeed and a pitch angle both exceed respective thresholds, as in 1006. The pitch angle threshold and corresponding horizontal airspeed threshold may be dependent upon one another and correspond to a pitch and horizontal airspeed necessary for the aerial vehicle to receive sufficient lift from the ring wing of the aerial vehicle for horizontal flight.

If it is determined that one or both of the horizontal airspeed or the pitch angle do not exceed respective thresholds, a determination is made as to whether the command has been satisfied, as in 1008. If it is determined that the command has been satisfied, the example process completes, as in 1010. If it is determined that the command has not been satisfied, the example process 1000 returns to block 1004 and continues.

Returning to decision block 1006, if it is determined that both the horizontal air speed exceeds the horizontal airspeed threshold and the pitch angle exceeds the pitch angle threshold, the thrust of the two propulsion mechanisms that are oriented in a substantially horizontal direction is increased, as in 1012, and the thrust generated by the other propulsion mechanisms, referred to as the maneuverability propulsion mechanisms when the aerial vehicle is in a horizontal flight orientation, is decreased or terminated, as in 1014. When the aerial vehicle is moving in a horizontal direction that exceeds the horizontal airspeed threshold, and the pitch angle of the aerial vehicle exceeds the pitch angle threshold, the aerial vehicle is considered to be in the horizontal flight orientation discussed above.

When the aerial vehicle is in the horizontal flight orientation, the thrust of the horizontally aligned propulsion mechanisms is increased to continue to propel the aerial vehicle in a horizontal direction and to account for the decrease in thrust provided by the other propulsion mechanisms. When the aerial vehicle is in the horizontal flight orientation and moving at a horizontal airspeed speed that exceeds the airspeed threshold, the aerodynamic shape of the ring wing produces sufficient lift to maintain the aerial vehicle in horizontal flight. The forces generated by the horizontally aligned propulsion mechanisms propel the aerial vehicle horizontally.

The aerial vehicle continues to aerially navigate in the horizontal direction and completes the aerial command, as in 1016. The horizontal flight orientation of the implementations described herein improve the efficiency and flight range of the aerial vehicles compared to aerial vehicles that must utilize all propulsion mechanisms to horizontally navigate.

Figure 11:
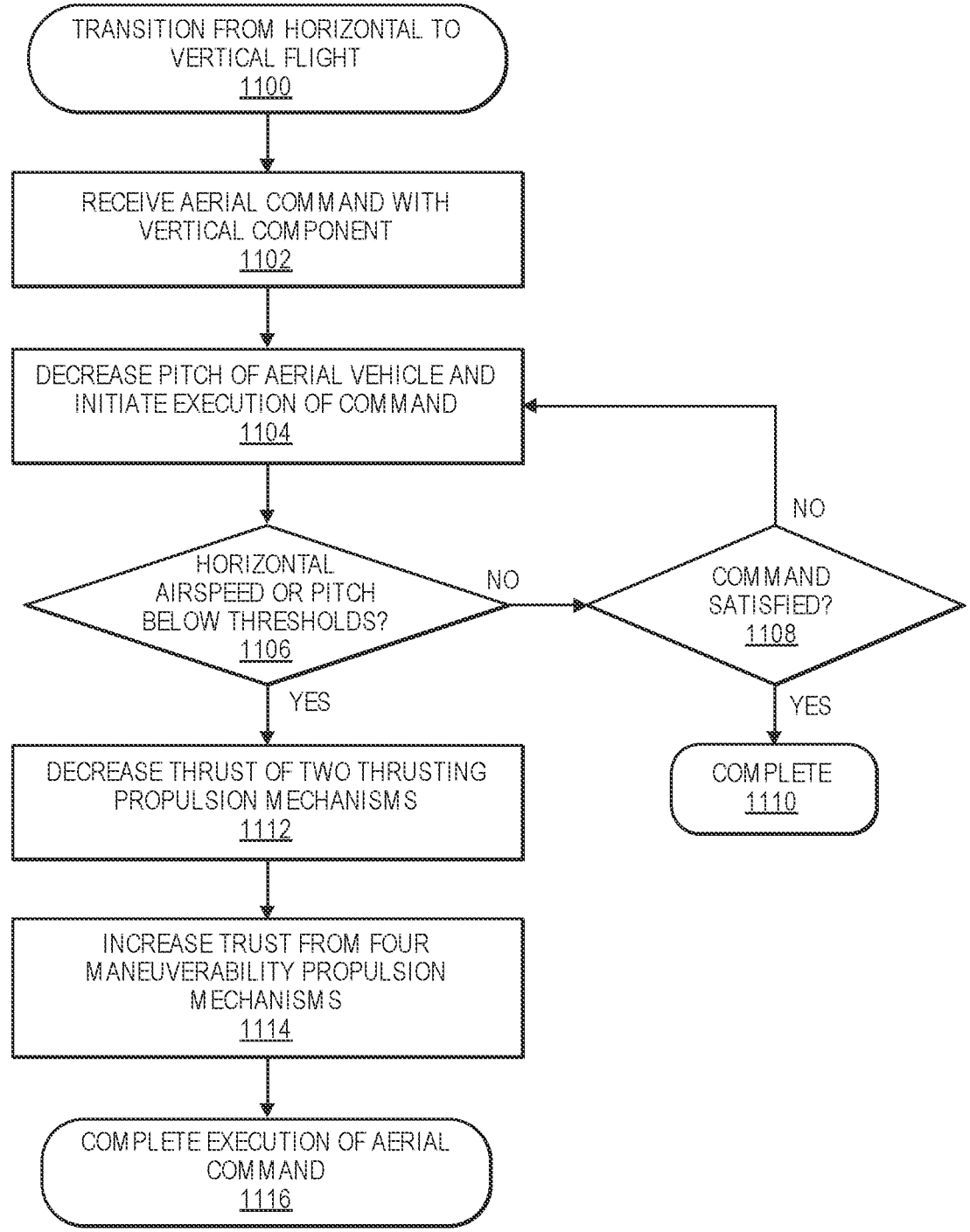
FIG. 11 is a flow diagram illustrating an example transition from horizontal flight to vertical flight process, in accordance with disclosed implementations.

FIG. 11 is a flow diagram illustrating an example transition from horizontal flight to vertical flight process 1100, in accordance with disclosed implementations. The example process may be performed by any of the aerial vehicles discussed herein that include a plurality of propulsion mechanisms and a ring wing surrounding at least a portion of the plurality of propulsion mechanisms, when the aerial vehicle is operating in a horizontal flight orientation. The example process 1100 begins upon receipt of an aerial command that includes a vertical component, as in 1102. The command may be received from a remote source, such as a controller, remote computing resource, other aerial vehicle, etc. In other examples, the command may be part of a defined flight path, determined by the aerial vehicle as part of autonomous operation, etc.

Upon receiving a command that includes a vertical component, forces are generated by one or more of the propulsion mechanisms and/or one or more ailerons of the ring wing that cause the pitch of the aerial vehicle to decrease and may cause the horizontal airspeed to decrease, as in 1104. As discussed further below, different forces may be produced by different propulsion mechanisms that cause a pitching moment about the Y axis to decrease.

As the pitch of the aerial vehicle decreases and possibly the horizontal airspeed decreases, a determination is made as to whether the horizontal airspeed or the pitch angle of the aerial vehicle are below respective thresholds, as in 1106. The pitch angle threshold and corresponding horizontal airspeed threshold may be dependent upon one another and correspond to a pitch and horizontal airspeed necessary for the aerial vehicle to receive sufficient lift from the ring wing of the aerial vehicle for horizontal flight.

If it is determined that neither the pitch angle nor the horizontal airspeed are below respective thresholds, a determination is made as to whether the command has been satisfied, as in 1108. If it is determined that the command has been satisfied, the example process completes, as in 1110. If it is determined that the command has not been satisfied, the example process 1100 returns to block 1104 and continues.

Returning to decision block 1106, if it is determined that either the horizontal air speed is below the horizontal airspeed threshold or the pitch angle is below the pitch angle threshold, the thrust of the two propulsion mechanisms that were oriented in a substantially horizontal direction is decreased, as in 1112, and the thrust generated by the other propulsion mechanisms is increased, as in 1114. When the aerial vehicle is moving below a horizontal airspeed threshold and has a pitch angle that is below the pitch angle threshold, the aerial vehicle is considered to be in the VTOL orientation discussed above.

When the aerial vehicle is in the VTOL orientation, the thrust produced by each of the propulsion mechanisms is used to maintain flight of the aerial vehicle and to aerially navigate or maneuver the aerial vehicle.

The aerial vehicle continues to aerially navigate in the vertical direction and completes the aerial command, as in 1116. The VTOL flight orientation of the implementations described herein improve the maneuverability of the aerial vehicle, enabling the aerial vehicle to complete vertical takeoff, landing, payload delivery, and to operate and maneuver within confined spaces.

Providing an aerial vehicle that can transition between a VTOL orientation and a horizontal flight orientation, as discussed herein, improves the overall performance, safety, and efficiency of the aerial vehicle. For example, if the aerial vehicle is to aerially navigate a customer ordered item for delivery to the customer, the aerial vehicle may be loaded with the payload (customer item), depart in a substantially vertical direction from a source location in a VTOL orientation until the aerial vehicle reaches a defined altitude and then transition to a horizontal flight orientation to efficiently and quickly navigate to a position at a defined altitude above the customer delivery location. Upon reaching a position above the customer delivery location, the aerial vehicle can transition from the horizontal flight orientation to the VTOL orientation, descend vertically to the delivery location and deliver the item. Upon completion of item delivery, the aerial vehicle may ascend vertically and navigate to another location.

Figure 12:
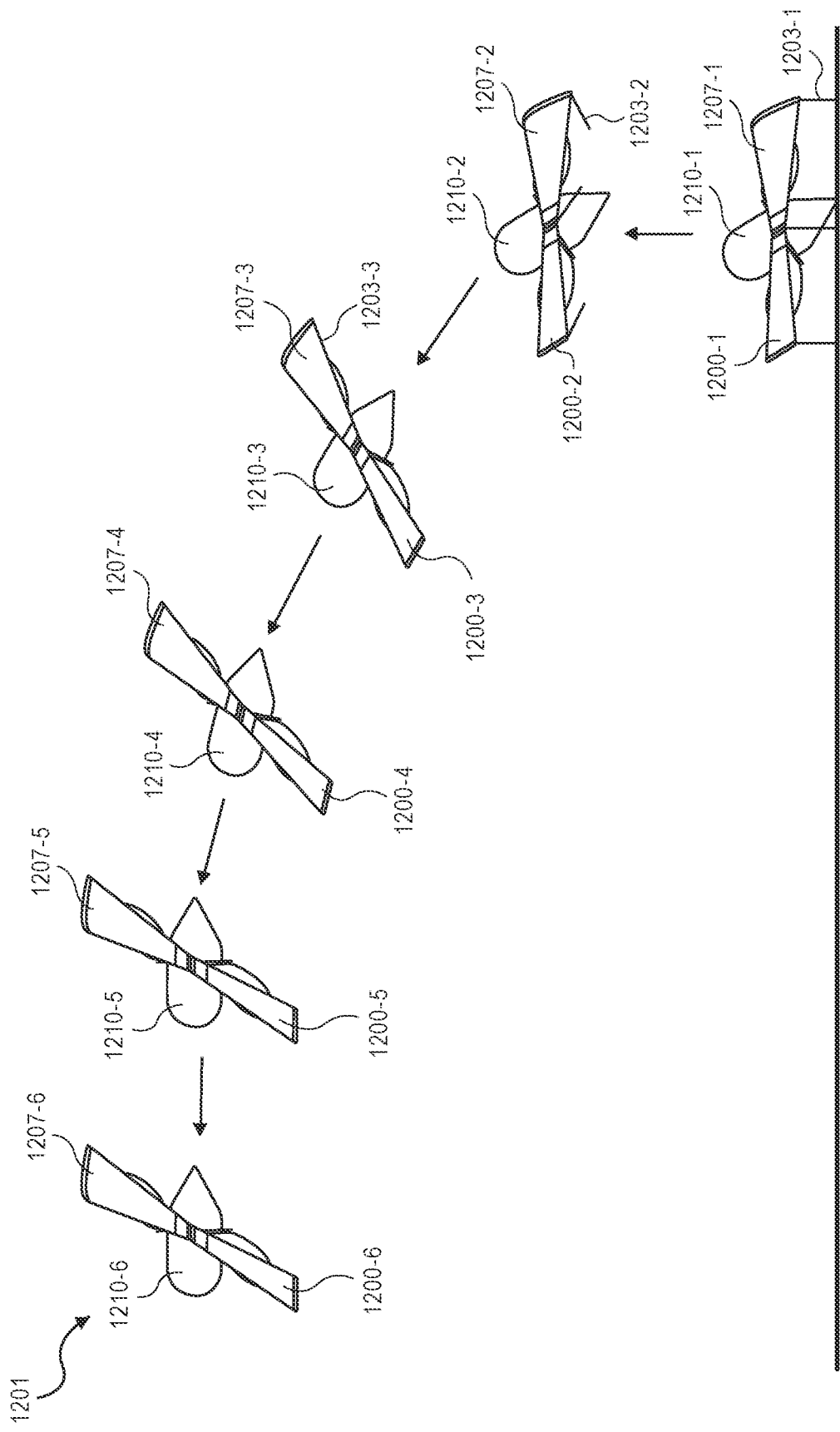
FIG. 12 illustrates an example flight transition from a vertical takeoff to horizontal flight, in accordance with disclosed implementations.

FIG. 12 illustrates an example flight transition 1201 from a vertical takeoff in a VTOL orientation to horizontal flight in a horizontal flight orientation, in accordance with disclosed implementations. The transition from a VTOL orientation to horizontal flight orientation may be performed by any of the aerial vehicles discussed herein. In this example, at an initial time, the aerial vehicle 1200-1 is landed, positioned in a VTOL orientation such that the ring wing 1207-1 is horizontally aligned in the X-Y plane and the fuselage 1210-1 is rotated at an angle with respect to vertical. The landing gear 1203-1 is also deployed to support the aerial vehicle.

The aerial vehicle then produces vertical thrust using propulsion mechanisms that cause the aerial vehicle to vertically ascend to an altitude, as illustrated by aerial vehicle 1200-2. At the second point in time, the aerial vehicle 1200-2 is still in the VTOL orientation, with the fuselage 1210-2 rotated from vertical and the ring wing and corresponding propulsion mechanisms horizontally aligned in the X-Y plane. In this example, as the aerial vehicle ascends the landing gear 1203-2 rotates and begins to contract toward the ring wing 1207-2.

At time three, illustrated by aerial vehicle 1200-3, the aerial vehicle begins to pitch forward by producing different forces by different propulsion mechanisms that cause a pitch moment about the Y axis. As illustrated, as the aerial vehicle 1200-3 begins to pitch forward, the ring wing 1207-3 and the propulsion mechanisms are no longer horizontally aligned and the aerial vehicle begins moving in the direction of the alignment of the fuselage 1210-3. Finally, at time three, the landing gear 1203-3 in this example has been fully retracted.

At time four, as illustrated by aerial vehicle 1200-4, pitch of the aerial vehicle 1200-4 continues to increase and the horizontal airspeed of the vehicle continues to increase. As the pitch and horizontal airspeed increase, the ring wing moves into a more vertical orientation and begins to generate a lifting force that will maintain the aerial vehicle at an altitude. In addition, the lifting force generated by the ring wing will cause the aerial vehicle to continue to rotate to the horizontal flight orientation, as illustrated at time five by aerial vehicle 1200-5.

At time five, the aerial vehicle 1200-5 is in the horizontal flight orientation, the fuselage 1210-5 is oriented horizontally and the aerial vehicle is aerially navigating in a direction that includes a substantially horizontal component. As discussed above, when the aerial vehicle is in the horizontal flight orientation, two of the propulsion mechanisms are horizontally aligned to produce thrusting forces in the substantially horizontal direction. As such, the forces produced by those two propulsion mechanisms are increased and the other propulsion mechanisms disabled, reduced, or allowed to rotate freely to produce energy that is used to charge a power module of the aerial vehicle. In some implementations, the non-used propulsion mechanisms may be adjustable such that they can be folded or positioned out of the way to reduce drag of the aerial vehicle.

As the aerial vehicle operates in the horizontal flight orientation, as illustrated at time six by aerial vehicle 1200-6, the fuselage 1210-6 remains horizontally oriented in the direction of travel and the ring wing 1207-6 remains oriented to produce lift that supports efficient horizontal flight of the aerial vehicle. In the horizontal flight orientation, the aerial vehicle can aerially navigate at high speeds with lower power consumption, thereby increasing the operating range of the aerial vehicle.

Figure 13:
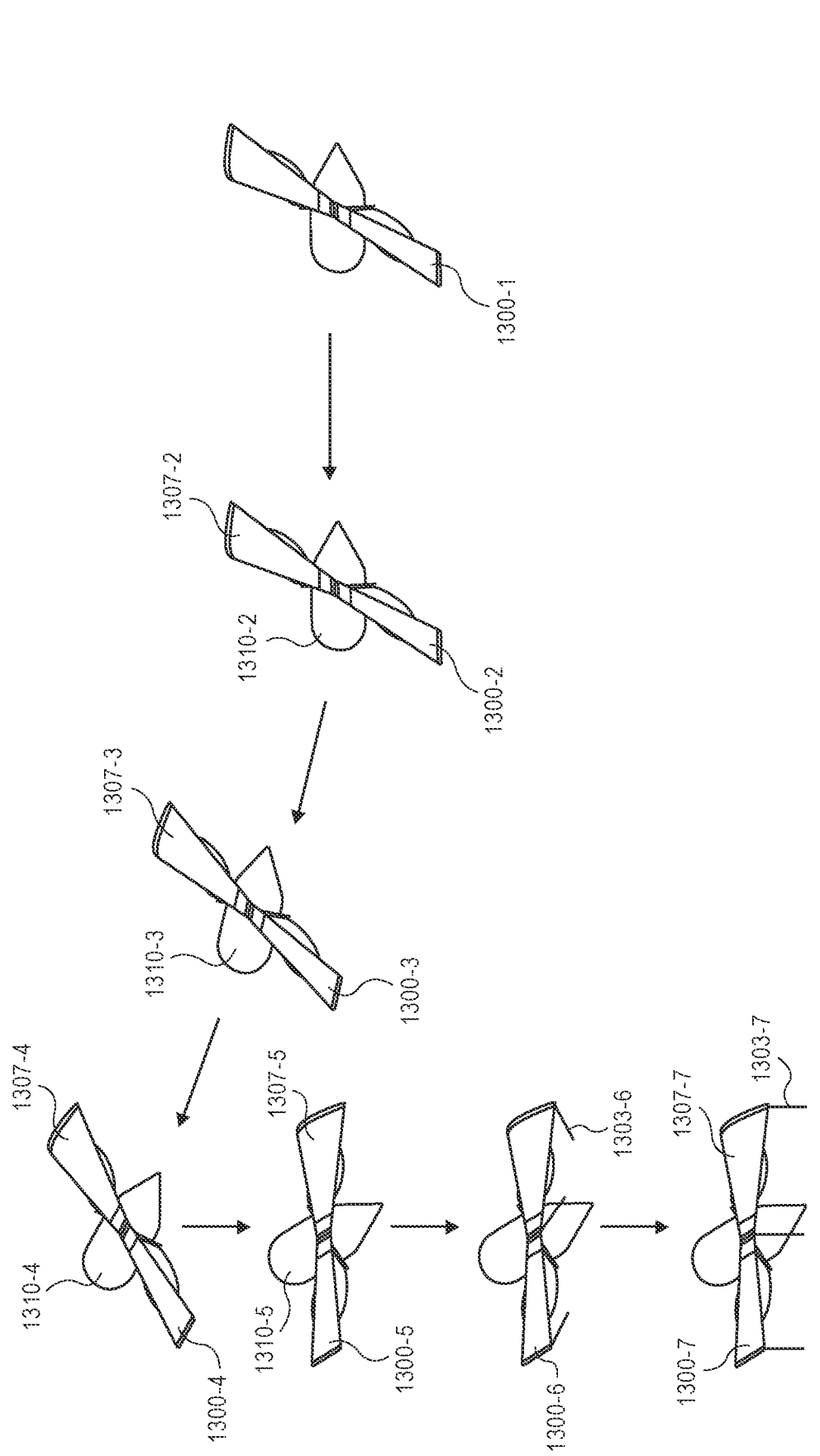
FIG. 13 illustrates an example flight transition from a horizontal flight to a vertical landing, in accordance with disclosed implementations.

FIG. 13 illustrates an example flight transition 1301 from a horizontal flight orientation to a VTOL orientation, in accordance with disclosed implementations. In this example, at time one, illustrated by aerial vehicle 1300-1, the aerial vehicle is in the horizontal flight orientation and aerially navigating in a substantially horizontal direction. At time two, illustrated by aerial vehicle 1300-2, the aerial vehicle receives a command to transition to a VTOL orientation and descend. In executing the command, the forces generated by the propulsion mechanisms and/or the ailerons of the ring wing, cause the pitch of the aerial vehicle 1300-3 to begin to decrease such that the ring wing 1307-3 begins to rotate toward horizontal and the fuselage 1310-3 begins to rotate away from the horizontal orientation. As the pitch decreases and the ring wing rotates, the horizontal airspeed of the aerial vehicle decreases and the lifting force generated by the ring wing decreases. To counteract the decrease in lift from the ring wing, the forces generated by the propulsion mechanisms of the aerial vehicle are increased so that the aerial vehicle maintains flight.

At time four, illustrated by aerial vehicle 1300-4, the horizontal airspeed has substantially terminated, the pitch of the aerial vehicle continues to decrease such that the ring wing 1307-4 continues to rotate more toward horizontal and the fuselage 1310-4 continues to rotate upward. Likewise, the forces produced by the propulsion mechanisms of the aerial vehicle 1300-4 are producing lift sufficient to maintain the aerial vehicle at altitude.

At time five, illustrated by aerial vehicle 1300-5, the aerial vehicle has completed transition such that the ring wing 1307-5 is horizontally aligned in the X-Y plane, the fuselage 1310-5 is rotated away from horizontal and the propulsion mechanisms of the aerial vehicle 1300-5 are providing lift and maneuverability of the aerial vehicle 1300-5.

By decreasing the forces produced by the propulsion mechanisms, the aerial vehicle 1300-6, at time six, is descending and the landing gear 1303-6 begins to deploy. Finally, at time seven, the aerial vehicle 1300-7 has descended, the landing gear 1303-7 has deployed and the aerial vehicle maintains the VTOL orientation in which the ring wing 1307-7 and corresponding propulsion mechanisms are horizontally aligned in the X-Y plane. In this example, the forces generated by the propulsion mechanisms allow the aerial vehicle to hover above the surface. In such a position, the aerial vehicle 1300-7 may deploy or complete delivery of a payload, land, ascend, or move in any of the six degrees of freedom.

FIGS. 14-19 are diagrams of the propulsion mechanisms of the aerial vehicle illustrated in FIGS. 1-8 viewed from overhead, or from a top-down perspective, when the aerial vehicle is in a VTOL orientation. To aid in explanation, other components of the aerial vehicle have been omitted from FIGS. 14-19 and different forces in the X or Y direction that may be generated by one or more of the propulsion mechanisms are illustrated by vectors. For purposes of discussion, forces generated in the Z direction, or the Z component of forces by the propulsion mechanisms have been omitted from FIGS. 14-19. Except where otherwise noted, the sum of the Z components of the forces produced by the propulsion mechanisms are equal and opposite the gravitation force acting on the aerial vehicle such that the altitude of the aerial vehicle will remain substantially unchanged.

As will be appreciated, the altitude or vertical position of the aerial vehicle may be increased or decreased by further altering the forces generated by the propulsion mechanisms such that the sum of the Z components of the forces are greater (to increase altitude) or less (to decrease altitude) than the gravitational force acting upon the aerial vehicle.

Figure 18:
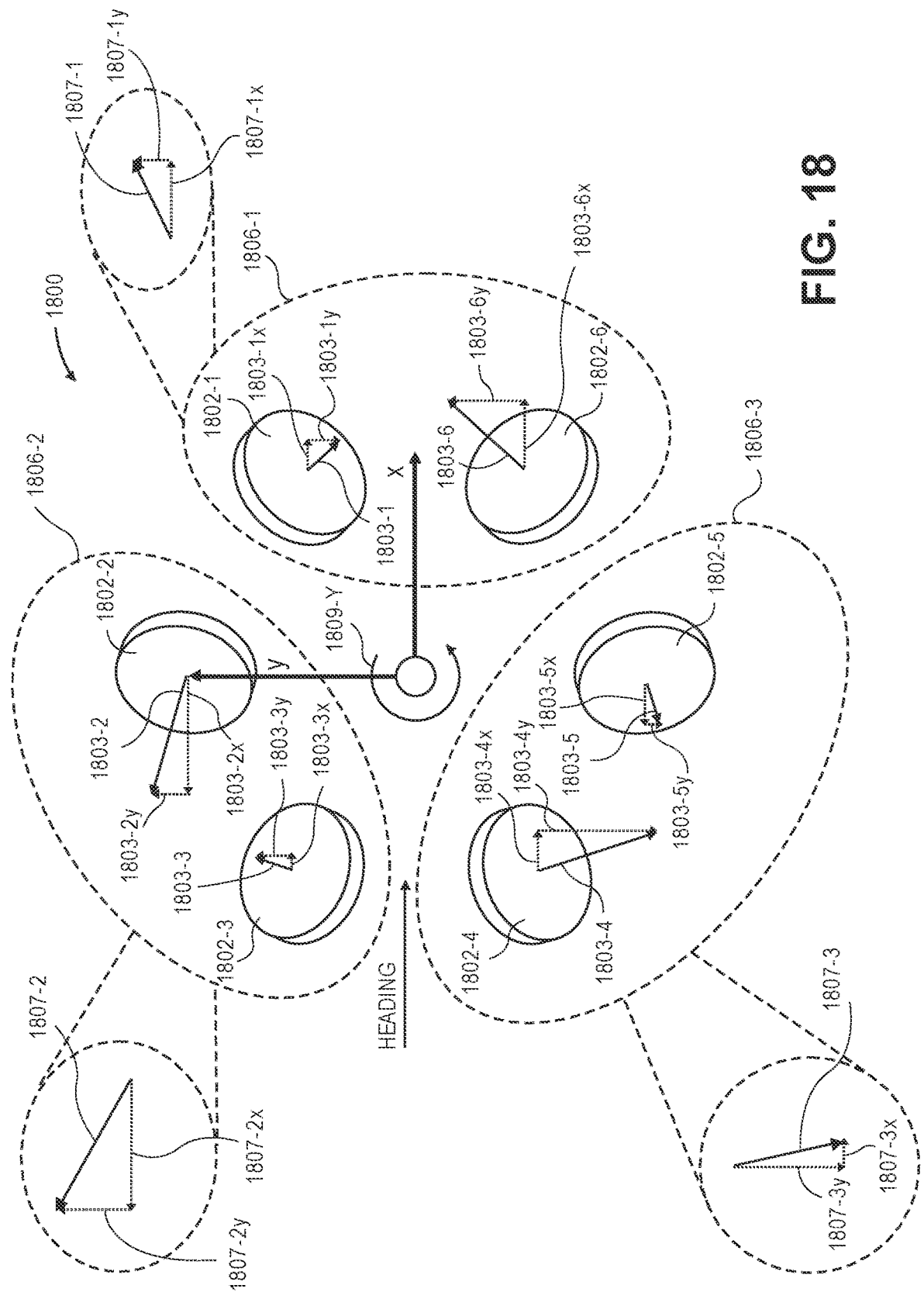
FIG. 18 is a diagram of the propulsion mechanisms of the aerial vehicle illustrated in FIGS. 1-13 with thrust vectors to cause the aerial vehicle to yaw, when the aerial vehicle is in a vertical takeoff and landing orientation, in accordance with disclosed implementations.
Figure 19:
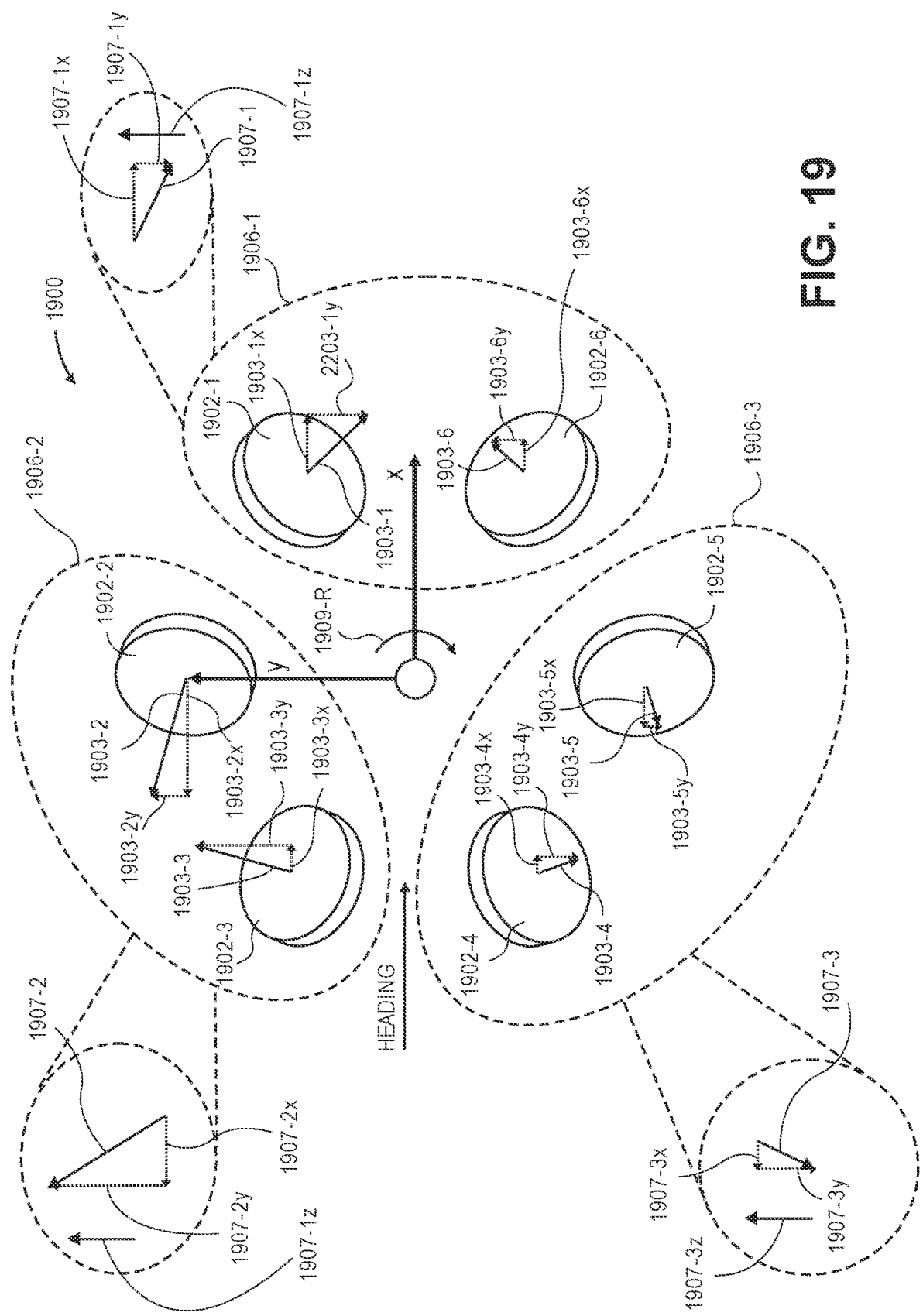
FIG. 19 is a diagram of the propulsion mechanisms of the aerial vehicle illustrated in FIGS. 1-13 with thrust vectors to cause the aerial vehicle to roll, when the aerial vehicle is in a vertical takeoff and landing orientation, in accordance with disclosed implementations.

The illustrated forces, when generated, will cause the aerial vehicle, when the aerial vehicle is in the illustrated VTOL orientation, to surge in the X direction (FIG. 14), sway in the Y direction (FIG. 15), hover (FIG. 16), pitch (FIG. 17), yaw (FIG. 18), and roll (FIG. 19).

While the below examples discuss summing of the components of the forces to determine a magnitude and direction of a net force and/or a moment, it will be appreciated that the discussion is for explanation purposes only. The net forces and moments for the illustrated aerial vehicles may be determined by control systems, such as that discussed with respect to FIG. 20 based on the configuration of the aerial vehicle. For example, an influence matrix may be utilized to determine a net force (or net force components) and moments for an aerial vehicle given particular forces or thrusts generated by each propulsion mechanism. Likewise, an inverse influence matrix may be utilized to determine required forces or thrusts for each propulsion mechanism given a desired force, or net force components and moments.

Referring to the aerial vehicle illustrated in FIGS. 1-8 and assuming the propulsion mechanisms are oriented about the respective motor arms approximately thirty degrees in alternating directions, and assuming the propulsion mechanisms are located 1 radius from the origin of the aerial vehicle and the aerial vehicle is in the VTOL orientation, the following influence matrix may be used to determine the X, Y, and Z components of a net force and the moments about the X, Y, and Z axis given thrusts for each of the six propulsion mechanisms:

$$\begin{bmatrix} .250 & -.433 & .866 & .425 & -.736 & -.528 \\ -.500 & 0 & .866 & .850 & 0 & .528 \\ .250 & .433 & .866 & .425 & .736 & -.528 \\ .250 & -.433 & .866 & -.425 & .736 & .528 \\ -.500 & 0 & .866 & -.850 & 0 & -.528 \\ .250 & .433 & .866 & -.425 & -.736 & .528 \end{bmatrix} \begin{bmatrix} T1 \\ T2 \\ T3 \\ T4 \\ T5 \\ T6 \end{bmatrix} = \begin{bmatrix} Fx \\ Fy \\ Fz \\ Mx \\ My \\ Mz \end{bmatrix}$$

Likewise, the following inverse influence matrix may be used to determine the thrusts for each of the six propulsion mechanisms given desired net force components and moments:

$$\begin{bmatrix} .333 & -.577 & .192 & .196 & -.340 & -.316 \\ -.667 & 0 & .192 & .392 & 0 & .316 \\ .333 & .577 & .192 & .196 & .340 & -.316 \\ .333 & -.577 & .192 & -.196 & .340 & .316 \\ -.667 & 0 & .192 & -.392 & 0 & -.316 \\ .333 & .577 & .192 & -.196 & -.340 & .316 \end{bmatrix} \begin{bmatrix} Fx \\ Fy \\ Fz \\ Mx \\ My \\ Mz \end{bmatrix} = \begin{bmatrix} T1 \\ T2 \\ T3 \\ T4 \\ T5 \\ T6 \end{bmatrix}$$

Figure 14:
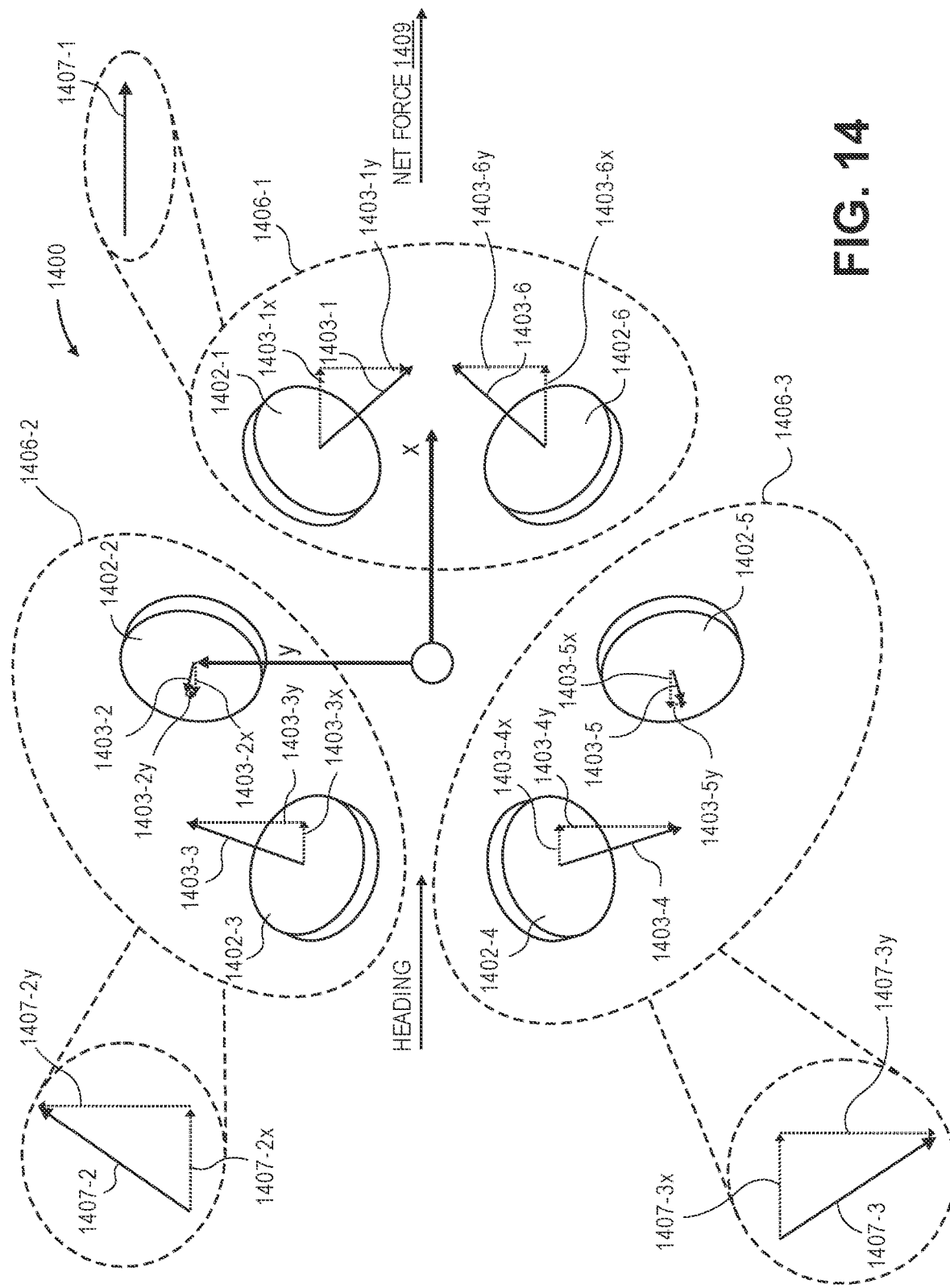
FIG. 14 is a diagram of the propulsion mechanisms of the aerial vehicle illustrated in FIGS. 1-13 with thrust vectors to cause the aerial vehicle to surge in the X direction, when the aerial vehicle is in a vertical takeoff and landing orientation, in accordance with disclosed implementations.

FIG. 14 is a diagram of the propulsion mechanisms 1402 of the aerial vehicles discussed herein with thrust vectors 1403 to cause the aerial vehicle to surge in the X direction, when the aerial vehicle is in the VTOL orientation, in accordance with disclosed implementations. As discussed above, each of the propulsion mechanisms 1402 are approximately in the same plane, in this example, the X-Y plane and oriented in pairs 1406 as discussed above. Likewise, while the aerial vehicle may navigate in any direction, when the aerial vehicle is in the VTOL orientation, FIG. 14 indicates a heading of the aerial vehicle 1400.

In the configuration of the aerial vehicle 1400, to cause the aerial vehicle 1400 to surge in the X direction, propulsion mechanisms 1402-1, 1402-3, 1402-4, and 1402-6 generate forces 1403-1, 1403-3, 1403-4, and 1403-6 of approximately equal magnitude, referred to in this example as a first magnitude. Likewise, propulsion mechanisms 1402-2 and 1402-5 each produce a force 1403-2 and 1403-5 of equal magnitude, referred to herein as a second magnitude. The second magnitude of forces 1403-2 and 1403-5 is less than the first magnitude of the forces 1403-1, 1403-3, 1403-4, and 1403-6. Each of the forces 1403-1, 1403-2, 1403-3, 1403-4, 1403-5, and 1403-6 have an X component, a Y component, and a Z component. As discussed above, the sum of the Z components of the forces 1403-1, 1403-2, 1403-3, 1403-4, 1403-5, and 1403-6 in the illustrated example is equal and opposite to the gravitational force acting upon the aerial vehicle. Accordingly, for ease of explanation and illustration, the Z components of the forces have been omitted from discussion and FIG. 14.

Because of the orientation of the first propulsion mechanism 1402-1 in the first direction and because the first propulsion mechanism 1402-1 is producing a first force 1403-1 having the first magnitude, the first force 1403-1 has a direction that includes a positive X component 1403-1x and a negative Y component 1403-1y. Likewise, because of the orientation of the sixth propulsion mechanism 1402-6 in the second direction and because the sixth propulsion mechanism 1402-6 is producing a sixth force 1403-6 having the first magnitude, the sixth force 1403-6 has a direction that includes a positive X component 1403-6x and a positive Y component 1403-6y. In addition, because both forces 1403-1 and 1403-6 are of approximately equal magnitude and the orientation of the propulsion mechanisms are both approximately thirty degrees but in opposing directions, the magnitude of the respective X components are approximately equal, the direction of the X components are the same, the magnitude of the respective Y components are approximately equal, and the direction of the Y components are opposite. Summing the forces 1403-1 and 1403-6, the resultant force 1407-1 for the first pair 1406-1 of propulsion mechanisms has a third magnitude, a positive X component that is the sum of the X component 1403-1x and the X component 1403-6x, and no Y component, because the sum of the positive Y component 1403-6y and the negative Y component 1403-1y cancel each other out.

Turning to the second pair 1406-2 of propulsion mechanisms 1402-2 and 1402-3, because of the orientation of the third propulsion mechanism 1402-3 in the first direction and because the third propulsion mechanism 1402-3 is producing a third force 1403-3 having the first magnitude, the third force 1403-3 has a direction that includes a positive X component 1403-3x and a positive Y component 1403-3y. Likewise, because of the orientation of the second propulsion mechanism 1402-2 in the second direction and because the second propulsion mechanism 1402-2 is producing a second force 1403-2 having the second magnitude, the second force 1403-2 has a direction that includes a negative X component 1403-2x and a positive Y component 1403-2y. Summing the forces 1403-3 and 1403-2, the resultant force 1407-2 for the second pair 1406-2 of propulsion mechanisms has a fourth magnitude, a positive X component 1407-2x that is the difference of the larger positive X component 1403-3x and the smaller negative X component 1403-2x, and a positive Y component 1407-2y that is the sum of the positive Y component 1403-3y and the positive Y component 1403-2y.

For the third pair 1406-3 of propulsion mechanisms 1402-5 and 1402-4, because of the orientation of the fifth propulsion mechanism 1402-5 in the first direction and because the fifth propulsion mechanism 1402-5 is producing a fifth force 1403-5 having the second magnitude, the fifth force 1403-5 has a direction that includes a negative X component 1403-5x and a negative Y component 1403-5y. Likewise, because of the orientation of the fourth propulsion mechanism 1402-4 in the second direction and because the fourth propulsion mechanism 1402-4 is producing a fourth force 1403-4 having the first magnitude, the fourth force 1403-4 has a direction that includes a positive X component 1403-4x and a negative Y component 1403-4y. Summing the forces 1403-5 and 1403-4, the resultant force 1407-3 for the third pair 1406-3 of propulsion mechanisms has the fourth magnitude, a positive X component 1407-3x that is the difference of the larger positive X component 1403-4x and the smaller negative X component 1403-5x, and a negative Y component 1407-3y that is the sum of the negative Y component 1403-5y and the negative Y component 1403-4y.

Because of the positioning of the second pair 1406-2 with respect to the third pair 1406-3 of propulsion mechanisms and because the pairs are producing similar forces, the resultant forces 1407-2 and 1407-3 have approximately the same magnitude, the fourth magnitude, approximately the same X component magnitudes having the same directions, and approximately equal Y component magnitudes, but having opposite directions.

Finally, summing each of the three resultant forces 1407-1, 1407-2, and 1407-3, the net force 1409 has a fifth magnitude, a positive X direction having a magnitude that is the sum of the x components 1407-1x, 1407-2x, and 1407-3x of the first resultant force 1407-1, the second resultant force 1407-2, and the third resultant force 1407-3 and no Y component, because first resultant force 1407-1 has no Y component and the magnitudes of opposing Y components 1407-2y and 1407-3y of the second resultant force 1407-2 and third resultant force 1407-3 cancel each other out. Because the net force 1409 has a fifth magnitude, a positive X component and no Y component, the net force 1409 will cause the aerial vehicle 1400 to surge in the positive X direction.

Figure 15:
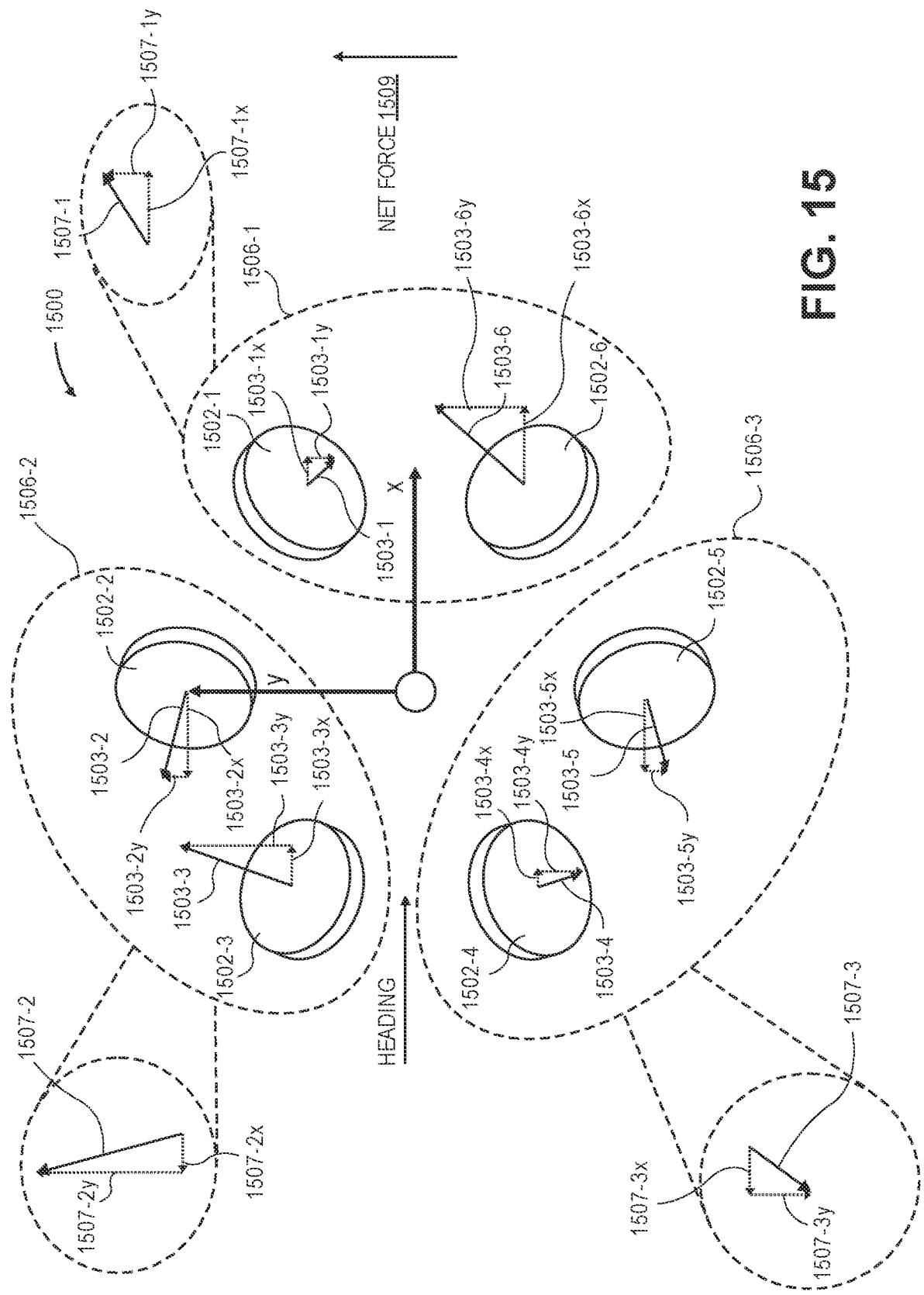
FIG. 15 is a diagram of the propulsion mechanisms of the aerial vehicle illustrated in FIGS. 1-13 with thrust vectors to cause the aerial vehicle to sway in the Y direction, when the aerial vehicle is in a vertical takeoff and landing orientation, in accordance with disclosed implementations.

FIG. 15 is a diagram of the propulsion mechanisms 1502 of the aerial vehicles discussed herein with thrust vectors 1503 to cause the aerial vehicle to sway in the Y direction, when the aerial vehicle is in the VTOL orientation, in accordance with disclosed implementations. As discussed above, each of the propulsion mechanisms 1502 are approximately in the same plane, in this example, the X-Y plane and oriented in pairs 1506 as discussed above. Likewise, while the aerial vehicle may navigate in any direction, when the aerial vehicle is in the VTOL orientation, FIG. 15 indicates a heading of the aerial vehicle 1500.

In the configuration of the aerial vehicle 1500, to cause the aerial vehicle 1500 to sway in the Y direction, the first propulsion mechanism 1502-1 generates a first force 1503-1 of a first magnitude, the second propulsion mechanism 1502-2 generates a second force 1503-2 of a second magnitude, the third propulsion mechanism 1502-3 generates a third force of a third magnitude, the fourth propulsion mechanism 1502-4 generates a fourth force 1503-4 of a fourth magnitude, the fifth propulsion mechanism 1502-5 generates a fifth force 1503-5 of a fifth magnitude, and the sixth propulsion mechanism 1502-6 generates a sixth force 1503-6 of a sixth magnitude.

Each of the forces 1503-1, 1503-2, 1503-3, 1503-4, 1503-5, and 1503-6 have an X component, a Y component, and a Z component. As discussed above, the sum of the Z components of the forces 1503-1, 1503-2, 1503-3, 1503-4, 1503-5, and 1503-6 in the illustrated example is equal and opposite to the gravitational force acting upon the aerial vehicle. Accordingly, for ease of explanation and illustration, the Z components of the forces have been omitted from discussion and FIG. 15.

Because of the orientation of the first propulsion mechanism 1502-1 in the first direction and because the first propulsion mechanism 1502-1 is producing a first force 1503-1 having the first magnitude, the first force 1503-1 has a direction that includes a positive X component 1503-1x and a negative Y component 1503-1y. Likewise, because of the orientation of the sixth propulsion mechanism 1502-6 in the second direction and because the sixth propulsion mechanism 1502-6 is producing a sixth force 1503-6 having a sixth magnitude, the sixth force 1503-6 has a direction that includes a positive X component 1503-6x and a positive Y component 1503-6y. Summing the forces 1503-1 and 1503-6, the resultant force 1507-1 for the first pair 1506-1 of propulsion mechanisms has a seventh magnitude, a positive X component 1507-1x that is the sum of the X component 1503-1x and the X component 1503-6x, and positive Y component 1507-1y that is the difference between the larger positive Y component 1503-6y and the smaller negative Y component 1503-1y.

Turning to the second pair 1506-2 of propulsion mechanisms 1502-2 and 1502-3, because of the orientation of the third propulsion mechanism 1502-3 in the first direction and because the third propulsion mechanism 1502-3 is producing the third force 1503-3 having the third magnitude, the third force 1503-3 has a direction that includes a positive X component 1503-3x and a positive Y component 1503-3y. Likewise, because of the orientation of the second propulsion mechanism 1502-2 in the second direction and because the second propulsion mechanism 1502-2 is producing a second force 1503-2 having the second magnitude, the second force 1503-2 has a direction that includes a negative X component 1503-2x and a positive Y component 1503-2y. Summing the forces 1503-3 and 1503-2, the resultant force 1507-2 for the second pair 1506-2 of propulsion mechanisms has an eighth magnitude, a negative X component 1507-2x that is the difference of the larger negative X component 1503-2x and the smaller positive X component 1503-3x, and a positive Y component 1507-2y that is the sum of the positive Y component 1503-3y and the positive Y component 1503-2y.

For the third pair 1506-3 of propulsion mechanisms 1502-5 and 1502-4, because of the orientation of the fifth propulsion mechanism 1502-5 in the first direction and because the fifth propulsion mechanism 1502-5 is producing the fifth force 1503-5 having the fifth magnitude, the fifth force 1503-5 has a direction that includes a negative X component 1503-5x and a negative Y component 1503-5y. Likewise, because of the orientation of the fourth propulsion mechanism 1502-4 in the second direction and because the fourth propulsion mechanism 1502-4 is producing the fourth force 1503-4 having the fourth magnitude, the fourth force 1503-4 has a direction that includes a positive X component 1503-4x and a negative Y component 1503-4y. Summing the forces 1503-5 and 1503-4, the resultant force 1507-3 for the third pair 1506-3 of propulsion mechanisms has a ninth magnitude, a negative X component 1507-3x that is the difference of the larger negative X component 1503-5x and the smaller positive X component 1503-4x, and a negative Y component 1507-3y that is the sum of the negative Y component 1503-5y and the negative Y component 1503-4y.

Because of the positioning of the three pairs of maneuverability components 1506-1, 1506-2, and 1506-3, the sum of the resultant forces 1507-1, 1507-2, and 1507-3 results in a net force 1509 having a tenth magnitude, a positive Y component and no X component. For example, summing the resultant X components 1507-1x, 1507-2x, and 1507-3x, the two negative X components 1507-2x and 1507-3x combine to cancel out the positive X component 1507-1x, resulting in no X component for the net force 1509. Similarly, the sum of the two positive Y components 1507-1y and 1507-2y are larger than the negative Y component 1507-3y such that the sum of all the resultant Y components provides a positive Y component for the net force 1509 such that the aerial vehicle 1500 will sway in the positive Y direction.

Figure 16:
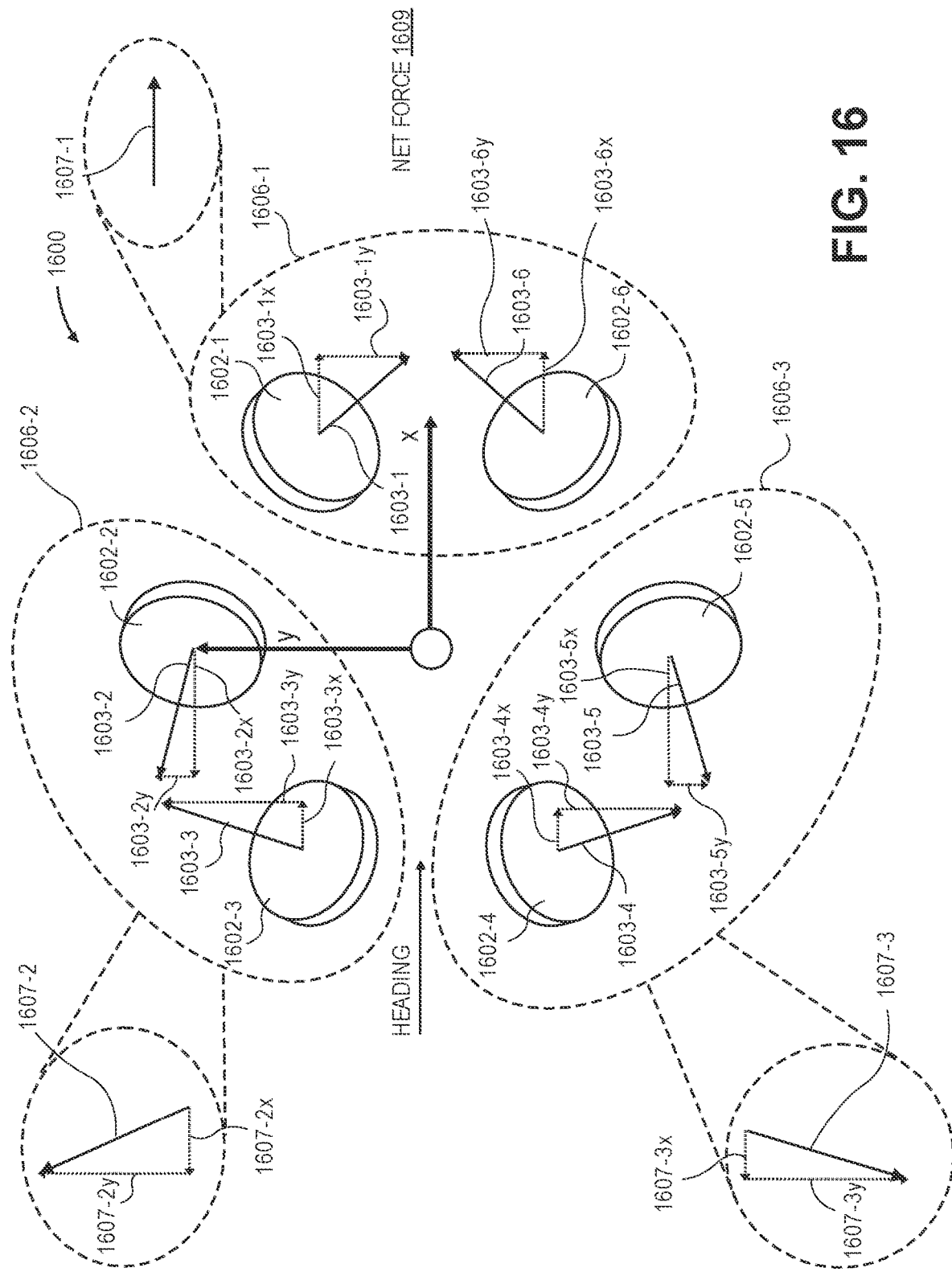
FIG. 16 is a diagram of the propulsion mechanisms of the aerial vehicle illustrated in FIGS. 1-13 with thrust vectors to cause the aerial vehicle to hover or heave in the Z direction, when the aerial vehicle is in a vertical takeoff and landing orientation, in accordance with disclosed implementations.

FIG. 16 is a diagram of the propulsion mechanisms 1602 of the aerial vehicles discussed herein with thrust vectors 1603 to cause the aerial vehicle to hover, ascend or descend in the Z direction, when the aerial vehicle is in the VTOL orientation, in accordance with disclosed implementations. As discussed above, each of the propulsion mechanisms 1602 are approximately in the same plane, in this example, the X-Y plane and oriented in pairs 1606 as discussed above. Likewise, while the aerial vehicle may navigate in any direction, when the aerial vehicle is in the VTOL orientation, FIG. 16 indicates a heading of the aerial vehicle 1600.

In the configuration of the aerial vehicle 1600, to cause the aerial vehicle 1600 to hover, ascend or descend in the Z direction, the first propulsion mechanism 1602-1, the second propulsion mechanism 1602-2, the third propulsion mechanism 1602-3, the fourth propulsion mechanism 1602-4, the fifth propulsion mechanism 1602-5, and the sixth propulsion mechanism 1602-6 all generate a force 1603 of approximately equal magnitude, referred to in this example as a first magnitude.

Each of the forces 1603-1, 1603-2, 1603-3, 1603-4, 1603-5, and 1603-6 have an X component, a Y component, and a Z component. As discussed above, in implementations in which the aerial vehicle is to maintain a hover, the sum of the Z components of the forces 1603-1, 1603-2, 1603-3, 1603-4, 1603-5, and 1603-6 in the illustrated example is equal and opposite to the gravitational force acting upon the aerial vehicle. If the aerial vehicle is to ascend, the force generated by each of the propulsion mechanisms is increased in equal amounts such that the sum of the forces in the Z direction is larger than the gravitational force. In comparison, if the aerial vehicle is to descend, the forces generated by each of the propulsion mechanisms is decreased by equal amounts such that the sum of the forces in the Z direction is less than the gravitational force. For ease of explanation and illustration, the Z components of the forces have been omitted from discussion and FIG. 16. Discussion with respect to FIG. 16 will illustrate how the sum X components and Y components cancel out such that the net force 1609 only has a Z component.

Because of the orientation of the first propulsion mechanism 1602-1 in the first direction and because the first propulsion mechanism 1602-1 is producing a first force 1603-1 having the first magnitude, the first force 1603-1 has a direction that includes a positive X component 1603-1$x$ and a negative Y component 1603-1$y$. Likewise, because of the orientation of the sixth propulsion mechanism 1602-6 in the second direction and because the sixth propulsion mechanism 1602-6 is producing a sixth force 1603-6 having the first magnitude, the sixth force 1603-6 has a direction that includes a positive X component 1603-6$x$ and a positive Y component 1603-6$y$. In addition, because the sixth force 1603-6 and the first force 1603-1 have the same first magnitude and are oriented in opposing directions, the magnitude of the respective X components and Y components are the same. Likewise, the direction of the respective X components are the same and the direction of the respective Y components are opposite. Summing the forces 1603-1 and 1603-6, the resultant force 1607-1 for the first pair 1606-1 of propulsion mechanisms has a second magnitude, a positive X component that is the sum of the X component 1603-1$x$ and the X component 1603-6$x$, and no Y component, because the opposing Y components 1603-1$y$ and 1603-6$y$ cancel each other out.

Turning to the second pair 1606-2 of propulsion mechanisms 1602-2 and 1602-3, because of the orientation of the third propulsion mechanism 1602-3 in the first direction and because the third propulsion mechanism 1602-3 is producing the third force 1603-3 having the first magnitude, the third force 1603-3 has a direction that includes a positive X component 1603-3$x$ and a positive Y component 1603-3$y$. Likewise, because of the orientation of the second propulsion mechanism 1602-2 in the second direction and because the second propulsion mechanism 1602-2 is producing a second force 1603-2 having the first magnitude, the second force 1603-2 has a direction that includes a negative X component 1603-2$x$ and a positive Y component 1603-2$y$. Summing the forces 1603-3 and 1603-2, the resultant force 1607-2 for the second pair 1606-2 of propulsion mechanisms has a third magnitude, a negative X component 1607-2$x$ that is the difference of the larger negative X component 1603-2$x$ and the smaller positive X component 1603-3$x$, and a positive Y component 1607-2$y$ that is the sum of the positive Y component 1603-3$y$ and the positive Y component 1603-2$y$.

For the third pair 1606-3 of propulsion mechanisms 1602-5 and 1602-4, because of the orientation of the fifth propulsion mechanism 1602-5 in the first direction and because the fifth propulsion mechanism 1602-5 is producing the fifth force 1603-5 having the first magnitude, the fifth force 1603-5 has a direction that includes a negative X component 1603-5$x$ and a negative Y component 1603-5$y$. Likewise, because of the orientation of the fourth propulsion mechanism 1602-4 in the second direction and because the fourth propulsion mechanism 1602-4 is producing the fourth force 1603-4 having the first magnitude, the fourth force 1603-4 has a direction that includes a positive X component 1603-4$x$ and a negative Y component 1603-4$y$. Summing the forces 1603-5 and 1603-4, the resultant force 1607-3 for the third pair 1606-3 of propulsion mechanisms has the third magnitude, a negative X component 1607-3$x$ that is the difference of the larger negative X component 1603-5$x$ and the smaller positive X component 1603-4$x$, and a negative Y component 1607-3$y$ that is the sum of the negative Y component 1603-5$y$ and the negative Y component 1603-4$y$.

Because of the positioning of the three pairs of maneuverability components 1606-1, 1606-2, and 1606-3, the sum of the resultant forces 1607-1, 1607-2, and 1607-3 result in a net force 1609 having no X component and no Y component. Specifically, the positive Y component 1607-2$y$ cancels out with the negative Y component 1607-3$y$ because they have the same magnitude and opposite directions. Likewise, each of the negative X components 1607-2$x$ and 1607-3$x$ are approximately one-half of the positive X component 1607-1$x$ and combined the three X components cancel out. If the sum of the positive components of the forces 1603 generated from the propulsion mechanisms 1602 is equal and opposite the force of gravity, the aerial vehicle 1600 will hover. In comparison, if the sum of the positive Z components of the forces 1603 is greater than the force of gravity, the aerial vehicle 1600 will heave in the positive Z direction (i.e., in a substantially positive vertical direction). In comparison, if the sum of the Z components of the forces 1603 is less than the force of gravity, the aerial vehicle 1600 will heave in the negative Z direction (i.e., in a substantially negative vertical direction).

Figure 17:
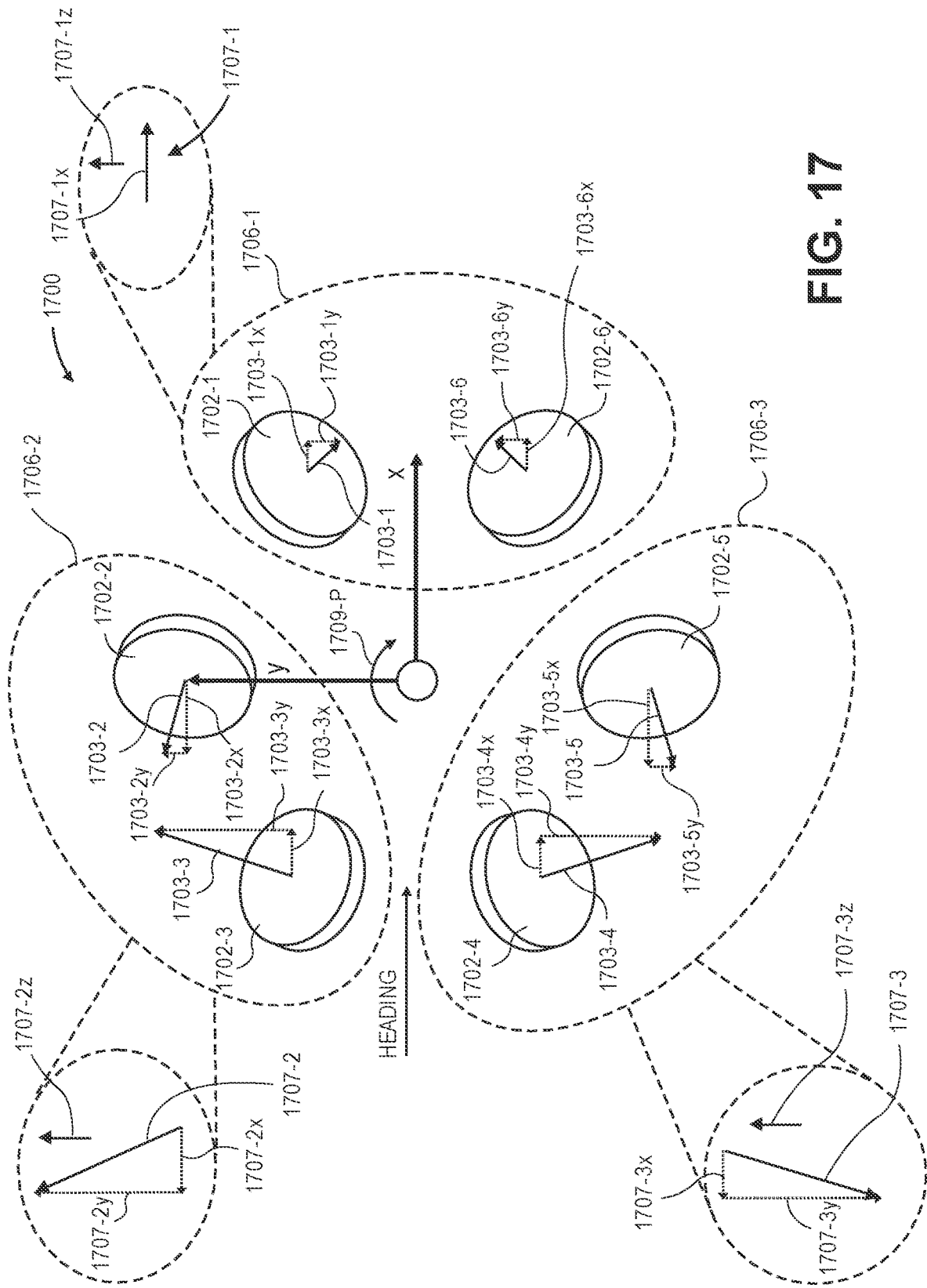
FIG. 17 is a diagram of the propulsion mechanisms of the aerial vehicle illustrated in FIGS. 1-13 with thrust vectors to cause the aerial vehicle to pitch, when the aerial vehicle is in a vertical takeoff and landing orientation, in accordance with disclosed implementations.

FIG. 17 is a diagram of the propulsion mechanisms 1702 of the aerial vehicles discussed herein with thrust vectors 1703 to cause the aerial vehicle to pitch about the Y axis, when the aerial vehicle is in the VTOL orientation, in accordance with disclosed implementations. As discussed above, each of the propulsion mechanisms 1702 are approximately in the same plane, in this example, the X-Y plane and oriented in pairs 1706 as discussed above. Likewise, while the aerial vehicle may navigate in any direction, when the aerial vehicle is in the VTOL orientation, FIG. 17 indicates a heading of the aerial vehicle 1700.

In the configuration of the aerial vehicle 1700, to cause the aerial vehicle 1700 to pitch about the Y axis, the first propulsion mechanism 1702-1 and the sixth propulsion mechanism 1702-6 generate a first force 1703-1 and sixth force 1703-6 that have approximately a same first magnitude. The third propulsion mechanism 1702-3 and the fourth propulsion mechanism 1704-2 generate a third force 1703-3 and a fourth force 1703-4 that have approximately a same second magnitude that is greater than the first magnitude. The second propulsion mechanism 1702-2 and the fifth propulsion mechanism 1702-5 produce a second force 1703-2 and a fifth force 1703-5 that have approximately a same third magnitude that is greater than the first magnitude and less than the second magnitude.

Each of the forces 1703-1, 1703-2, 1703-3, 1703-4, 1703-5, and 1703-6 have an X component, a Y component, and a Z component. In this example, to cause the aerial vehicle 1700 to pitch forward about the Y axis without also surging in the X direction, swaying in the Y direction, or heaving in the Z direction, the sum of the X components of all the forces generated by the propulsion mechanisms cancel out, the sum of the Y components of all the forces generated by the propulsion mechanisms cancel out, and the sum of the Z components of all the forces generated by the propulsion mechanisms and the force of gravity cancel out. However, as discussed further below, because the forces are produced at distances from the origin 1711, or center of gravity of the aerial vehicle 1700, and the magnitude of the Z component of the resultant force 1707-2 from the second pair of propulsion mechanisms 1706-2 and magnitude of the Z component of the resultant force 1707-3 from the third propulsion mechanism 1706-3 are larger than the magnitude of the Z component of the resultant force 1707-1 from the first pair of propulsion mechanisms 1706-1, the difference in the magnitude of the Z components of the forces and the offset from the origin 1711 produce a moment about the Y axis that causes the aerial vehicle to pitch forward about the Y axis. The greater the difference between the magnitude of the combination of Z components of the second pair of propulsion mechanisms 1706-2 and the third pair of propulsion mechanisms 1706-3 compared to the Z component of the first pair of propulsion mechanisms 1706-1, the greater the moment about the Y axis and the more the aerial vehicle will pitch about the Y axis. For ease of explanation and illustration, the Z components of the individual forces have been omitted from discussion and FIG. 17.

Because of the orientation of the first propulsion mechanism 1702-1 in the first direction and because the first propulsion mechanism 1702-1 is producing a first force 1703-1 having the first magnitude, the first force 1703-1 has a direction that includes a positive X component 1703-1$x$ and a negative Y component 1703-1$y$. Likewise, because of the orientation of the sixth propulsion mechanism 1702-6 in the second direction and because the sixth propulsion mechanism 1702-6 is producing a sixth force 1703-6 having the first magnitude, the sixth force 1703-6 has a direction that includes a positive X component 1703-6$x$ and a positive Y component 1703-6$y$. In addition, because the sixth force 1703-6 and the first force 1703-1 have the same first magnitude and are oriented in opposing directions, the magnitude of the respective X components and Y components are the same. Likewise, the direction of the respective X components are the same and the direction of the respective Y components are opposite. Summing the forces 1703-1 and 1703-6, the resultant force 1707-1 for the first pair 1706-1 of propulsion mechanisms has a fourth magnitude, a positive X component 1707-1$x$ that is the sum of the X component 1703-1$x$ and the X component 1703-6$x$, and no Y component, because the opposing Y components 1703-1$y$ and 1703-6$y$ cancel each other out. In addition, the resultant force 1707-1 of the first pair 1706-1 has a Z component 1707-1$z$ having a fifth magnitude in a positive Z component that is the sum of the positive Z components of the forces 1703-1 and 1703-6.

Turning to the second pair 1706-2 of propulsion mechanisms 1702-2 and 1702-3, because of the orientation of the third propulsion mechanism 1702-3 in the first direction and because the third propulsion mechanism 1702-3 is producing the third force 1703-3 having the second magnitude, the third force 1703-3 has a direction that includes a positive X component 1703-3$x$ and a positive Y component 1703-3$y$. Likewise, because of the orientation of the second propulsion mechanism 1702-2 in the second direction and because the second propulsion mechanism 1702-2 is producing a second force 1703-2 having the third magnitude, the second force 1703-2 has a direction that includes a negative X component 1703-2$x$ and a positive Y component 1703-2$y$. Summing the forces 1703-3 and 1703-2, the resultant force 1707-2 for the second pair 1706-2 of propulsion mechanisms has a sixth magnitude, a negative X component 1707-2$x$ that is the difference of the larger negative X component 1703-2$x$ and the smaller positive X component 1703-3$x$, and a positive Y component 1707-2$y$ that is the sum of the positive Y component 1703-3$y$ and the positive Y component 1703-2$y$. In addition, the resultant force 1707-2 of the second pair 1706-2 has a Z component having a seventh magnitude in a positive Z component that is larger than the fifth magnitude of the Z component 1707-1$z$ of the first resultant force 1707-1.

For the third pair 1706-3 of propulsion mechanisms 1702-5 and 1702-4, because of the orientation of the fifth propulsion mechanism 1702-5 in the first direction and because the fifth propulsion mechanism 1702-5 is producing the fifth force 1703-5 having the third magnitude, the fifth force 1703-5 has a direction that includes a negative X component 1703-5$x$ and a negative Y component 1703-5$y$. Likewise, because of the orientation of the fourth propulsion mechanism 1702-4 in the second direction and because the fourth propulsion mechanism 1702-4 is producing the fourth force 1703-4 having the second magnitude, the fourth force 1703-4 has a direction that includes a positive X component 1703-4$x$ and a negative Y component 1703-4$y$. Summing the forces 1703-5 and 1703-4, the resultant force 1707-3 for the third pair 1706-3 of propulsion mechanisms has the sixth magnitude, a negative X component 1707-3$x$ that is the difference of the larger negative X component 1703-5$x$ and the smaller positive X component 1703-4$x$, and a negative Y component 1707-3$y$ that is the sum of the negative Y component 1703-5$y$ and the negative Y component 1703-4$y$. In addition, the resultant force 1707-3 of the third pair 1706-3 has a Z component 1707-3 having the seventh magnitude in a positive Z component that is larger than the fifth magnitude of the Z component 1707-1$z$ of the first resultant force 1707-1.

Because of the positioning of the three pairs of maneuverability components 1706-1, 1706-2, and 1706-3, the sum of the resultant forces 1707-1, 1707-2, and 1707-3 results in a net force having no X component and no Y component. Specifically, the positive Y component 1707-2$y$ cancels out with the negative Y component 1707-3$y$ because they have the same magnitude and opposite directions. Likewise, each of the negative X components 1707-2$x$ and 1707-3$x$ are approximately one-half of the positive X component 1707-1$x$ and combined the three X components cancel out. Likewise, the sum of the magnitude of the Z components of the resultant forces 1707-1, 1707-2, and 1707-3 is equal and opposite to the force of gravity acting on the aerial vehicle 1500. However, because the seventh magnitude of Z components 1707-2z and 1707-3z of the resultant forces 1707-2 and 1707-3 from the second pair of propulsion mechanisms 1706-2 and the third pair of propulsion mechanisms 1706-3 are each greater than fifth magnitude of the Z component 1707-1z of the resultant force 1707-1 of the first pair of propulsion mechanisms 1706-1 and those forces are separated a distance from the origin 1711, a moment 1709-P about the Y axis results that causes the aerial vehicle 1500 to pitch forward about the Y axis.

FIG. 18 is a diagram of the propulsion mechanisms 1802 of the aerial vehicles discussed herein with thrust vectors 1803 to cause the aerial vehicle to yaw about the Z axis, when the aerial vehicle is in the VTOL orientation, in accordance with disclosed implementations. As discussed above, each of the propulsion mechanisms 1802 are approximately in the same plane, in this example, the X-Y plane and oriented in pairs 1806 as discussed above. Likewise, while the aerial vehicle may navigate in any direction, when the aerial vehicle is in the VTOL orientation, FIG. 18 indicates a heading of the aerial vehicle 1800.

In the configuration of the aerial vehicle 1800, to cause the aerial vehicle 1800 to yaw about the Z axis, the first propulsion mechanism 1802-1, the third propulsion mechanism 1802-3, and the fifth propulsion mechanism 1802-5 generate a first force 1803-1, a third force 1803-3, and fifth force 1803-5 that each have approximately a same first magnitude. Likewise, the second propulsion mechanism 1802-2, the fourth propulsion mechanism 1804-4, and the sixth propulsion mechanism 1802-6 generate a second force 1803-2, a fourth force 1803-4, and a sixth force 1803-6 that each have approximately a same second magnitude that is larger than the first magnitude.

Each of the forces 1803-1, 1803-2, 1803-3, 1803-4, 1803-5, and 1803-6 have an X component, a Y component, and a Z component. In this example, to cause the aerial vehicle 1800 to yaw about the Z axis without also surging in the X direction, swaying in the Y direction, or heaving in the Z direction, the sum of the X components of all the forces generated by the propulsion mechanisms cancel out, the sum of the Y components of all the forces generated by the propulsion mechanisms cancel out, and the sum of the Z components of all the forces generated by the propulsion mechanisms and the force of gravity cancel out. However, as discussed further below, because the forces are produced at distances from the origin 1811, or a center of gravity of the aerial vehicle 1800, the resultant forces 1807-1, 1807-2, and 1807-3 of the pairs of propulsion mechanisms 1806-1, 1806-2, and 1806-3 cause a moment about the Z axis in a counter-clockwise direction that cause the aerial vehicle to yaw about the Z axis in the counter-clockwise direction.

Because of the orientation of the first propulsion mechanism 1802-1 in the first direction and because the first propulsion mechanism 1802-1 is producing a first force 1803-1 having the first magnitude, the first force 1803-1 has a direction that includes a positive X component 1803-1x and a negative Y component 1803-1y. Likewise, because of the orientation of the sixth propulsion mechanism 1802-6 in the second direction and because the sixth propulsion mechanism 1802-6 is producing a sixth force 1803-6 having the second magnitude, the sixth force 1803-6 has a direction that includes a positive X component 1803-6x and a positive Y component 1803-6y. Summing the forces 1803-1 and 1803-6, the resultant force 1807-1 for the first pair 1806-1 of propulsion mechanisms has a third magnitude, a positive X component 807-1x that is the sum of the positive X component 1803-1x and the positive X component 1803-6x, and a positive Y component 1807-1y that is the difference between the larger positive Y component 1803-6y and the smaller negative Y component 1803-1y.

Turning to the second pair 1806-2 of propulsion mechanisms 1802-2 and 1802-3, because of the orientation of the third propulsion mechanism 1802-3 in the first direction and because the third propulsion mechanism 1802-3 is producing the third force 1803-3 having the first magnitude, the third force 1803-3 has a direction that includes a positive X component 1803-3x and a positive Y component 1803-3y. Likewise, because of the orientation of the second propulsion mechanism 1802-2 in the second direction and because the second propulsion mechanism 1802-2 is producing a second force 1803-2 having the second magnitude, the second force 1803-2 has a direction that includes a negative X component 1803-2x and a positive Y component 1803-2y. Summing the forces 1803-3 and 1803-2, the resultant force 1807-2 for the second pair 1806-2 of propulsion mechanisms has a fourth magnitude, a negative X component 1807-2x that is the difference of the larger negative X component 1803-2x and the smaller positive X component 1803-3x, and a positive Y component 1807-2y that is the sum of the positive Y component 1803-3y and the positive Y component 1803-2y.

For the third pair 1806-3 of propulsion mechanisms 1802-5 and 1802-4, because of the orientation of the fifth propulsion mechanism 1802-5 in the first direction and because the fifth propulsion mechanism 1802-5 is producing the fifth force 1803-5 having the first magnitude, the fifth force 1803-5 has a direction that includes a negative X component 1803-5x and a negative Y component 1803-5y. Likewise, because of the orientation of the fourth propulsion mechanism 1802-4 in the second direction and because the fourth propulsion mechanism 1802-4 is producing the fourth force 1803-4 having the second magnitude, the fourth force 1803-4 has a direction that includes a positive X component 1803-4x and a negative Y component 1803-4y. Summing the forces 1803-5 and 1803-4, the resultant force 1807-3 for the third pair 1806-3 of propulsion mechanisms has the fourth magnitude, a positive X component 1807-3x that is the difference of the larger positive X component 1803-4x and the smaller negative X component 1803-5x, and a negative Y component 1807-3y that is the sum of the negative Y component 1803-5y and the negative Y component 1803-4y.

Because of the positioning of the three pairs of maneuverability components 1806-1, 1806-2, and 1806-3, the sum of the resultant forces 1807-1, 1807-2, and 1807-3 results in a net force having no X component and no Y component. Likewise, the Z component of the net force is canceled out by the force of gravity. The positive Y component 1807-1y and the positive Y component 1807-2y cancel out the negative Y component 1807-3y. Likewise, the positive X component 1807-1x and the positive X component 1807-3x cancel out the negative X component 1807-2x. Likewise, the sum of the magnitude of the Z components of the resultant forces 1807-1, 1807-2, and 1807-3 is equal and opposite to the force of gravity acting on the aerial vehicle 1800. However, because the resultant forces 1807-1, 1807-2, and 1807-3 are separated by a distance from the origin 1811, or the center of gravity of the aerial vehicle 1811, those forces produce a moment 1809-Y about the Z axis, thereby causing the aerial vehicle 1800 to yaw about the Z axis.

FIG. 19 is a diagram of the propulsion mechanisms 1902 of the aerial vehicles discussed herein with thrust vectors 1903 to cause the aerial vehicle to roll about the X axis, when the aerial vehicle is in the VTOL orientation, in accordance with disclosed implementations. As discussed above, each of the propulsion mechanisms 1902 are approximately in the same plane, in this example, the X-Y plane and oriented in pairs 1906 as discussed above. Likewise, while the aerial vehicle may navigate in any direction, when the aerial vehicle is in the VTOL orientation, FIG. 19 indicates a heading of the aerial vehicle 1900.

In the configuration of the aerial vehicle 1900, to cause the aerial vehicle 1900 to roll about the X axis, the first propulsion mechanism 1902-1, the second propulsion mechanism 1902-2, and the third propulsion mechanism 1902-3 generate a first force 1903-1, a second force 1903-2, and a third force 1903-3 that have approximately a same first magnitude. The fourth propulsion mechanism 1902-4, fifth propulsion mechanism 1902-5, and the sixth propulsion mechanism 1902-6 generate a fourth force 1903-4, a fifth force 1903-5, and a sixth force 1903-6 that have approximately a same second magnitude that is less than the first magnitude.

Each of the forces 1903-1, 1903-2, 1903-3, 1903-4, 1903-5, and 1903-6 have an X component, a Y component, and a Z component. In this example, to cause the aerial vehicle 1900 to roll about the X axis without also surging in the X direction, swaying in the Y direction, or heaving in the Z direction, the sum of the X components of all the forces generated by the propulsion mechanisms cancel out, the sum of the Y components of all the forces generated by the propulsion mechanisms cancel out, and the sum of the Z components of all the forces generated by the propulsion mechanisms and the force of gravity cancel out. However, as discussed further below, because the forces are produced at distances from the origin and the magnitude of the Z component of the forces 1903-1, 1903-2, and 1903-3 are larger than the magnitude of the Z component of the forces 1903-4, 1903-5, and 1903-6, the difference in the magnitude of the Z components of the forces and the offset from the origin 1911 result in a moment about the X axis that causes the aerial vehicle 1900 to roll about the X axis. The greater the difference between the magnitude of the combination of Z components of the first force 1903-1, second force 1903-2, and third force 1903-3 compared to the magnitude of the Z components of the fourth force 1903-4, fifth force 1903-5, and sixth force 1903-6, the larger the moment and the more the aerial vehicle will roll about the X axis. For ease of explanation and illustration, the Z components of the individual forces have been omitted from discussion and FIG. 19.

Because of the orientation of the first propulsion mechanism 1902-1 in the first direction and because the first propulsion mechanism 1902-1 is producing a first force 1903-1 having the first magnitude, the first force 1903-1 has a direction that includes a positive X component 1903-1x and a negative Y component 1903-1y. Likewise, because of the orientation of the sixth propulsion mechanism 1902-6 in the second direction and because the sixth propulsion mechanism 1902-6 is producing a sixth force 1903-6 having the second magnitude, the sixth force 1903-6 has a direction that includes a positive X component 1903-6x and a positive Y component 1903-6y. Summing the forces 1903-1 and 1903-6, the resultant force 1907-1 for the first pair 1906-1 of propulsion mechanisms has a third magnitude, a positive X component 1907-1x that is the sum of the X component 1903-1x and the X component 1903-6x, and negative Y component 1907-1y that is the difference between the larger negative Y component 1903-1y and the smaller positive Y component 1903-6y. In addition, the resultant force 1907-1 of the first pair 1906-1 has a positive Z component 1907-1z having a fourth magnitude in a positive Z direction.

Turning to the second pair 1906-2 of propulsion mechanisms 1902-2 and 1902-3, because of the orientation of the third propulsion mechanism 1902-3 in the first direction and because the third propulsion mechanism 1902-3 is producing the third force 1903-3 having the first magnitude, the third force 1903-3 has a direction that includes a positive X component 1903-3x and a positive Y component 1903-3y. Likewise, because of the orientation of the second propulsion mechanism 1902-2 in the second direction and because the second propulsion mechanism 1902-2 is producing a second force 1903-2 having the first magnitude, the second force 1903-2 has a direction that includes a negative X component 1903-2x and a positive Y component 1903-2y. Summing the forces 1903-3 and 1903-2, the resultant force 1907-2 for the second pair 1906-2 of propulsion mechanisms has a fifth magnitude, a negative X component 1907-2x that is the difference of the larger negative X component 1903-2x and the smaller positive X component 1903-3x, and a positive Y component 1907-2y that is the sum of the positive Y component 1903-3y and the positive Y component 1903-2y. In addition, the resultant force 1907-2 of the second pair 1906-2 has a positive Z component 1907-2z having a sixth magnitude in a positive Z direction that is larger than the fourth magnitude 1907-1z of the first resultant force 1907-1.

For the third pair 1906-3 of propulsion mechanisms 1902-5 and 1902-4, because of the orientation of the fifth propulsion mechanism 1902-5 in the first direction and because the fifth propulsion mechanism 1902-5 is producing the fifth force 1903-5 having the second magnitude, the fifth force 1903-5 has a direction that includes a negative X component 1903-5x and a negative Y component 1903-5y. Likewise, because of the orientation of the fourth propulsion mechanism 1902-4 in the second direction and because the fourth propulsion mechanism 1902-4 is producing the fourth force 1903-4 having the second magnitude, the fourth force 1903-4 has a direction that includes a positive X component 1903-4x and a negative Y component 1903-4y. Summing the forces 1903-5 and 1903-4, the resultant force 1907-3 for the third pair 1906-3 of propulsion mechanisms has a seventh magnitude, a negative X component 1907-3x that is the difference of the larger negative X component 1903-5x and the smaller positive X component 1903-4x, and a negative Y component 1907-3y that is the sum of the negative Y component 1903-5y and the negative Y component 1903-4y. In addition, the resultant force 1907-3 of the third pair 1906-3 has a Z component having an eighth magnitude in a positive Z direction that is less than the sixth magnitude.

Because of the positioning of the three pairs of maneuverability components 1906-1, 1906-2, and 1906-3, the sum of the resultant forces 1907-1, 1907-2, and 1907-3 results in a net force having no X component and no Y component. Specifically, the positive Y component 1907-2y cancels out with the negative Y components 1907-1y and 1907-3y. Likewise, each of the negative X components 1907-2x and 1907-3x cancel out the positive X component 1907-1x. Likewise, the sum of the magnitude of the Z components of the resultant forces 1907-1, 1907-2, and 1907-3 is equal and opposite to the force of gravity acting on the aerial vehicle 1500. However, because the sum of the Z components of the first force 1903-1, second force 1903-2, and third force 1903-3 is greater than the sum of the Z components of the fourth force 1903-4, fifth force 1903-5, and sixth force 1903-6, and those forces are separated a distance from the origin, a moment 1909-R about the X axis results that causes the aerial vehicle 1900 to roll about the X axis.

Figure 20:
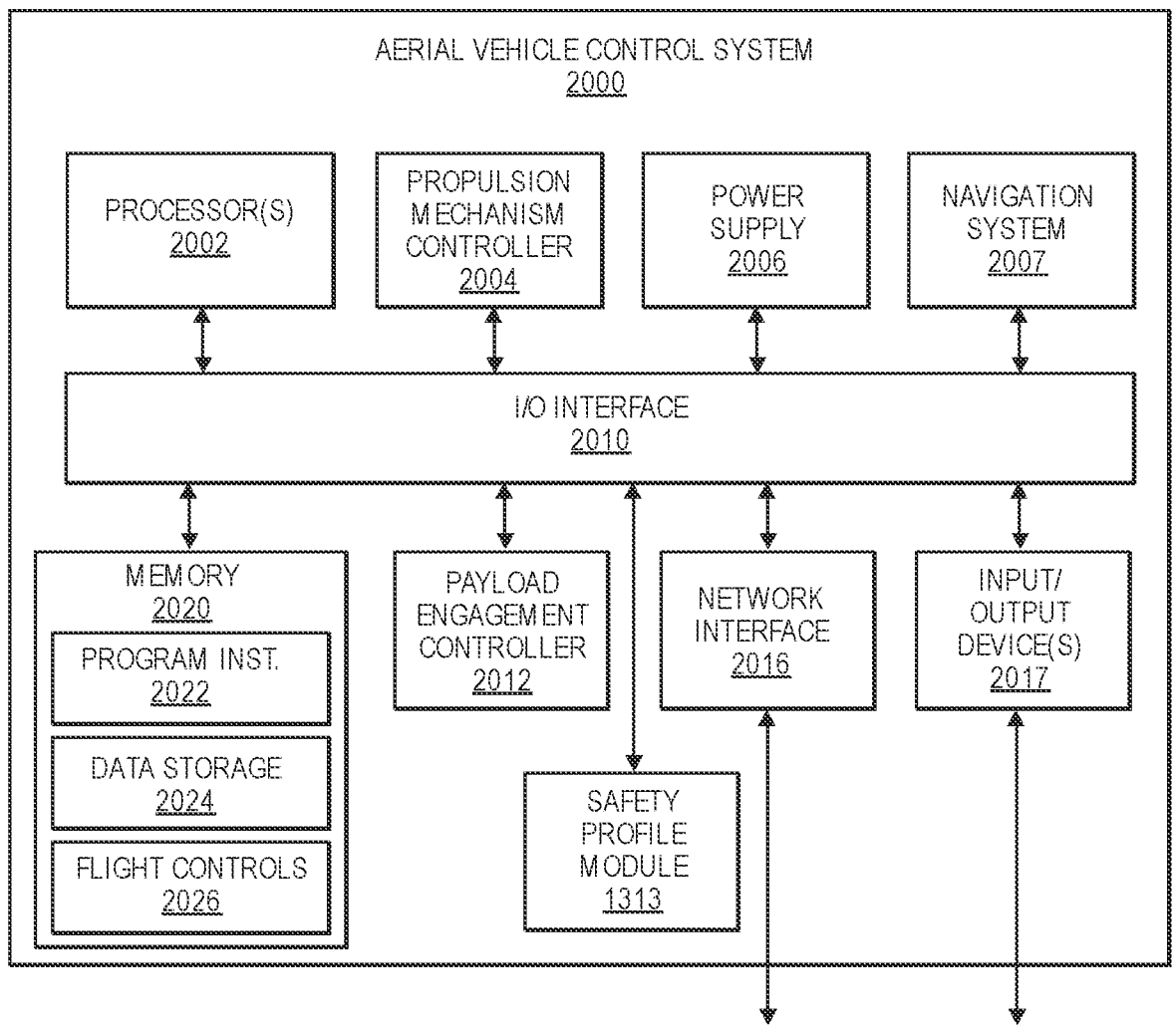
FIG. 20 is a block diagram illustrating various components of an unmanned aerial vehicle control system, in accordance with disclosed implementations.

FIG. 20 is a block diagram illustrating an example aerial vehicle control system 2000, in accordance with disclosed implementations. In various examples, the block diagram may be illustrative of one or more aspects of the aerial vehicle control system 2000 that may be used to implement the various systems and methods discussed herein and/or to control operation of an aerial vehicle discussed herein. In the illustrated implementation, the aerial vehicle control system 2000 includes one or more processors 2002, coupled to a memory, e.g., a non-transitory computer readable storage medium 2020, via an input/output (I/O) interface 2010. The aerial vehicle control system 2000 also includes propulsion mechanism controllers 2004, such as electronic speed controls (ESCs), power modules 2006 and/or a navigation system 2007. The aerial vehicle control system 2000 further includes a payload engagement controller 2012, a network interface 2016, and one or more input/output devices 2017.

In various implementations, the aerial vehicle control system 2000 may be a uniprocessor system including one processor 2002, or a multiprocessor system including several processors 2002 (e.g., two, four, eight, or another suitable number). The processor(s) 2002 may be any suitable processor capable of executing instructions. For example, in various implementations, the processor(s) 2002 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 2002 may commonly, but not necessarily, implement the same ISA.

The non-transitory computer readable storage medium 2020 may be configured to store executable instructions, data, flight paths, flight control parameters, center of gravity information, and/or data items accessible by the processor(s) 2002. In various implementations, the non-transitory computer readable storage medium 2020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 2020 as program instructions 2022, data storage 2024 and flight controls 2026, respectively. In other implementations, program instructions, data, and/or flight controls may be received, sent, or stored upon different types of computer-accessible media, such as non-transitory media, or on similar media separate from the non-transitory computer readable storage medium 2020 or the aerial vehicle control system 2000. Generally speaking, a non-transitory, computer readable storage medium may include storage media or memory media such as magnetic or optical media, e.g., disk or CD/DVD-ROM, coupled to the aerial vehicle control system 2000 via the I/O interface 2010. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 2016.

In one implementation, the I/O interface 2010 may be configured to coordinate I/O traffic between the processor(s) 2002, the non-transitory computer readable storage medium 2020, and any peripheral devices, the network interface or other peripheral interfaces, such as input/output devices 2017. In some implementations, the I/O interface 2010 may perform any necessary protocol, timing or other data transformations to convert data signals from one component (e.g., non-transitory computer readable storage medium 2020) into a format suitable for use by another component (e.g., processor(s) 2002). In some implementations, the I/O interface 2010 may include support for devices attached through various types of peripheral buses, such as a variant of the Peripheral Component Interconnect (PCI) bus standard or the Universal Serial Bus (USB) standard, for example. In some implementations, the function of the I/O interface 2010 may be split into two or more separate components, such as a north bridge and a south bridge, for example. Also, in some implementations, some or all of the functionality of the I/O interface 2010, such as an interface to the non-transitory computer readable storage medium 2020, may be incorporated directly into the processor(s) 2002.

The propulsion mechanism controllers 2004 communicate with the navigation system 2007 and adjust the rotational speed of each lifting propulsion mechanism and/or the propulsion mechanisms to stabilize the aerial vehicle and/or to perform one or more maneuvers and guide the aerial vehicle along a flight path.

The navigation system 2007 may include a global positioning system (GPS), indoor positioning system (IPS), or other similar system and/or sensors that can be used to navigate the aerial vehicle 100 to and/or from a location. The payload engagement controller 2012 communicates with the actuator(s) or motor(s) (e.g., a servo motor) used to engage and/or disengage items.

The network interface 2016 may be configured to allow data to be exchanged between the aerial vehicle control system 2000, other devices attached to a network, such as other computer systems (e.g., remote computing resources), and/or with aerial vehicle control systems of other aerial vehicles. For example, the network interface 2016 may enable wireless communication between the aerial vehicle and an aerial vehicle control system that is implemented on one or more remote computing resources. For wireless communication, an antenna of the aerial vehicle or other communication components may be utilized. As another example, the network interface 2016 may enable wireless communication between numerous aerial vehicles. In various implementations, the network interface 2016 may support communication via wireless general data networks, such as a Wi-Fi network. For example, the network interface 2016 may support communication via telecommunications networks, such as cellular communication networks, satellite networks, and the like.

Input/output devices 2017 may, in some implementations, include one or more displays, imaging devices, thermal sensors, infrared sensors, time of flight sensors, accelerometers, pressure sensors, weather sensors, etc. Multiple input/output devices 2017 may be present and controlled by the aerial vehicle control system 2000. One or more of these sensors may be utilized to assist in landing as well as to avoid obstacles during flight.

As shown in FIG. 20, the memory may include program instructions 2022, which may be configured to implement the example routines and/or sub-routines described herein. The data storage 2024 may include various data stores for maintaining data items that may be provided for determining flight paths, landing, identifying locations for disengaging items, determining which maneuver propulsion mechanisms to utilize to execute a maneuver, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 2000 is merely illustrative and is not intended to limit the scope of the present disclosure. In particular, the computing system and devices may include any combination of hardware or software that can perform the indicated functions. The aerial vehicle control system 2000 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 2000. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 2000 may be transmitted to the aerial vehicle control system 2000 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

While the above examples have been described with respect to aerial vehicles, the disclosed implementations may also be used for other forms of vehicles, including, but not limited to, ground based vehicles and water based vehicles.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and that "vertical" flight refers to flight traveling substantially radially outward from the earth's center. It should be understood by those having ordinary skill that trajectories may include components of both "horizontal" and "vertical" flight vectors.

Although the invention has been described and illustrated with respect to illustrative implementations thereof, the foregoing and various other additions and omissions may be made therein and thereto without departing from the spirit and scope of the present disclosure.

What is claimed is:

1. An aerial vehicle apparatus, comprising:
   a fuselage;
   a plurality of propulsion mechanisms coupled to and positioned around the fuselage; and
   a hexagonal ring wing coupled to and positioned around the fuselage;
   wherein the hexagonal ring wing is coupled to the fuselage by at least one motor arm.

2. The aerial vehicle apparatus of claim 1, wherein the hexagonal ring wing comprises six wing segments joined at adjacent ends to form the hexagonal ring wing.

3. The aerial vehicle apparatus of claim 2, wherein at least one of the six wing segments has an airfoil shape.

4. The aerial vehicle apparatus of claim 2, wherein at least one of the six wing segments includes an aileron to control flight of the aerial vehicle apparatus.

5. The aerial vehicle apparatus of claim 1, wherein:
the plurality of propulsion mechanisms are coupled to the fuselage by the at least one motor arm.

6. The aerial vehicle apparatus of claim 1, wherein:
the fuselage is aligned at an angle with respect to a vertical orientation when the aerial vehicle apparatus is in a vertical takeoff and landing (VTOL) orientation;
the plurality of propulsion mechanisms are substantially in a horizontal plane when the aerial vehicle apparatus is in the VTOL orientation; and
the hexagonal ring wing is aligned in a substantially horizontal direction when the aerial vehicle apparatus is oriented in the VTOL orientation.

7. The aerial vehicle apparatus of claim 6, wherein the plurality of propulsion mechanisms are angled such that each propulsion mechanism produces a force that includes a horizontal component and a vertical component when the aerial vehicle apparatus is in the VTOL orientation.

8. The aerial vehicle apparatus of claim 1, wherein:
the fuselage is aligned in a substantially horizontal direction when the aerial vehicle apparatus is in a horizontal flight orientation;
at least two of the propulsion mechanisms are aligned in the substantially horizontal direction and produce a respective force in the substantially horizontal direction when the aerial vehicle apparatus is in the horizontal flight orientation; and
the hexagonal ring wing produces a lifting force when the aerial vehicle apparatus is in the horizontal flight orientation and aerially navigating in the substantially horizontal direction.

9. The aerial vehicle apparatus of claim 8, wherein the hexagonal ring wing is offset from vertical when the aerial vehicle apparatus is in the horizontal flight orientation such that a lower wing segment of the hexagonal ring wing operates as a leading wing and an upper wing segment of the hexagonal ring wing operates as a rear wing of the aerial vehicle apparatus.

10. The aerial vehicle apparatus of claim 9, wherein the upper wing segment has a larger chord length, and the lower wing segment has a shorter chord length.

11. An apparatus, comprising:
a fuselage;
a plurality of propulsion mechanisms coupled to and positioned around the fuselage; and
a ring wing coupled to and positioned around the fuselage, the ring wing comprising six wing segments formed in a hexagonal shape;
wherein the ring wing is coupled to the fuselage by at least one motor arm.

12. The apparatus of claim 11, wherein at least one of the six wing segments of the ring wing has an airfoil shape, the at least one of the six wing segments producing a lifting force when the apparatus is in a horizontal flight orientation and aerially navigating in a substantially horizontal direction.

13. The apparatus of claim 11, wherein:
the fuselage is aligned at an angle with respect to a vertical orientation when the apparatus is in a vertical takeoff and landing (VTOL) orientation;
the plurality of propulsion mechanisms are substantially in a horizontal plane when the apparatus is in the VTOL orientation; and
the ring wing is aligned in a substantially horizontal direction when the apparatus is oriented in the VTOL orientation, the ring wing encompassing the plurality of propulsion mechanisms.

14. The apparatus of claim 13, wherein the plurality of propulsion mechanisms are angled such that each propulsion mechanism produces a force that includes a horizontal component and a vertical component when the apparatus is in the VTOL orientation.

15. The apparatus of claim 11, wherein:
the fuselage is aligned in a substantially horizontal direction when the apparatus is in a horizontal flight orientation;
at least two of the propulsion mechanisms are aligned in the substantially horizontal direction and produce a respective force in the substantially horizontal direction when the apparatus is in the horizontal flight orientation; and
the ring wing produces a lifting force when the apparatus is in the horizontal flight orientation and aerially navigating in the substantially horizontal direction.

16. The apparatus of claim 15, wherein the ring wing is offset from vertical when the apparatus is in the horizontal flight orientation such that a lower wing segment of the ring wing operates as a leading wing and an upper wing segment of the ring wing operates as a rear wing of the apparatus.

17. The apparatus of claim 16, wherein the upper wing segment has a larger chord length, and the lower wing segment has a shorter chord length.

18. An unmanned aerial vehicle apparatus, comprising:
a fuselage;
a plurality of propulsion mechanisms coupled to and positioned around the fuselage; and
a hexagonal ring wing coupled to and positioned around the fuselage, the hexagonal ring wing comprising a plurality of wing segments joined at adjacent ends to form a hexagonal shape;
wherein the hexagonal ring wing is coupled to the fuselage by at least one motor arm.

19. The unmanned aerial vehicle apparatus of claim 18, wherein:
the fuselage is aligned at an angle with respect to a vertical orientation when the unmanned aerial vehicle apparatus is in a vertical takeoff and landing (VTOL) orientation;
the plurality of propulsion mechanisms are substantially in a horizontal plane when the unmanned aerial vehicle apparatus is in the VTOL orientation; and
the hexagonal ring wing is aligned in a substantially horizontal direction when the unmanned aerial vehicle apparatus is oriented in the VTOL orientation, the hexagonal ring wing encompassing the plurality of propulsion mechanisms.

20. The unmanned aerial vehicle apparatus of claim 18, wherein:
the fuselage is aligned in a substantially horizontal direction when the unmanned aerial vehicle apparatus is in a horizontal flight orientation;
at least two of the propulsion mechanisms are aligned in the substantially horizontal direction and produce a respective force in the substantially horizontal direction when the unmanned aerial vehicle apparatus is in the horizontal flight orientation; and
at least some of the plurality of wing segments of the hexagonal ring wing have an airfoil shape to produce a respective lifting force when the unmanned aerial vehicle apparatus is in the horizontal flight orientation and aerially navigating in the substantially horizontal direction.

\* \* \* \* \*